(12) United States Patent
Kumar

(10) Patent No.: US 11,907,708 B2
(45) Date of Patent: Feb. 20, 2024

(54) APPLICATION AND INFRASTRUCTURE TEMPLATE MANAGEMENT TO EASILY CREATE SECURE APPLICATIONS FOR ENTERPRISES

(71) Applicant: Salesforce, Inc., San Francisco, CA (US)

(72) Inventor: Mayank Kumar, Fremont, CA (US)

(73) Assignee: Salesforce, Inc., San Francisco, CA (US)

( * ) Notice: Subject to any disclaimer, the term of this patent is extended or adjusted under 35 U.S.C. 154(b) by 67 days.

(21) Appl. No.: 17/833,778

(22) Filed: Jun. 6, 2022

(65) Prior Publication Data

US 2023/0118065 A1    Apr. 20, 2023

Related U.S. Application Data

(60) Provisional application No. 63/256,046, filed on Oct. 15, 2021.

(51) Int. Cl.
| | |
|---|---|
| G06F 8/65 | (2018.01) |
| G06F 11/36 | (2006.01) |
| G06F 8/71 | (2018.01) |
| G06F 9/54 | (2006.01) |
| G06F 21/57 | (2013.01) |
| G06F 21/62 | (2013.01) |

(52) U.S. Cl.
CPC .............. *G06F 8/71* (2013.01); *G06F 8/65* (2013.01); *G06F 9/54* (2013.01); *G06F 11/3684* (2013.01); *G06F 11/3688* (2013.01); *G06F 11/3692* (2013.01); *G06F 21/577* (2013.01); *G06F 21/6218* (2013.01); *G06F 2221/033* (2013.01)

(58) Field of Classification Search
CPC ..... G06F 8/65; G06F 8/71; G06F 9/54; G06F 11/3684; G06F 11/3688; G06F 11/3692; G06F 21/577; G06F 21/6218; G06F 2221/033
See application file for complete search history.

(56) References Cited

U.S. PATENT DOCUMENTS

| | | | | |
|---|---|---|---|---|
| 8,868,701 | B1 * | 10/2014 | Peters | G06Q 30/0641 709/221 |
| 9,268,562 | B1 * | 2/2016 | Mangtani | G06F 8/71 |
| 10,382,537 | B2 * | 8/2019 | Mordani | H04L 67/1044 |
| 10,467,386 | B2 * | 11/2019 | Yu | G06F 8/71 |
| 10,761,810 | B2 * | 9/2020 | Ramakrishna | G06F 8/65 |
| 11,308,447 | B2 * | 4/2022 | Stump | G06Q 10/06375 |

(Continued)

*Primary Examiner* — Douglas M Slachta

(57) ABSTRACT

An extensible platform-as-a-service (PaaS) system is used during the software development lifecycle (SDLC) processes of an application. The system, according to various embodiments, receives indications that changes are made to one or more templates or software bundles stored in a software library and coordinates how changes to a particular template will be applied to applications for an enterprise system. Specifically, the system may identify applications that are using the template and determine an ordering for a plurality of application groups that indicates a sequence in which the updates will be applied to the applications. In this manner, template updates can be automatically and systematically deployed to applications without significant involvement by users of the PaaS system.

20 Claims, 12 Drawing Sheets

(56) References Cited

U.S. PATENT DOCUMENTS

| | | | |
|---|---|---|---|
| 2016/0132806 A1* | 5/2016 | To | G06Q 10/06313 |
| | | | 705/7.23 |
| 2018/0336027 A1* | 11/2018 | Narayanan | G06F 8/71 |
| 2022/0253297 A1* | 8/2022 | Wallis | G06F 8/65 |
| 2022/0276842 A1* | 9/2022 | Delpech de Frayssinet | |
| | | | G06F 8/447 |

* cited by examiner

APPLICATION AND INFRASTRUCTURE TEMPLATE MANAGEMENT TO EASILY CREATE SECURE APPLICATIONS FOR ENTERPRISES

CROSS REFERENCE TO RELATED APPLICATIONS

This application claims the benefit of U.S. Provisional Application No. 63/256,046, filed Oct. 15, 2021, which is hereby incorporated by reference in its entirety.

BACKGROUND

Field of Art

This disclosure relates in general to updating software bundles, and in particular to a process of configuring a large number of applications with updated software bundles in an extensible Platform as a Service (PaaS).

Description of the Related Art

Software application developers within enterprises build systems targeting application-specific logic. However, the enterprises have complex software development life cycle (SDLC) processes and trust processes. Furthermore, the underlying infrastructure used by enterprises is constantly evolving. As a result, developers within these enterprises have to address a multitude of issues that arise from the complexities in the SDLC and security processes as well as the evolving infrastructure issues in the course of developing the specific application-specific logic and shipping the resulting code to production.

One of the steps in providing an Extensible PaaS for the application developers in the enterprise is rolling out updates to software bundles being used by these applications, that include a set of templates for configuring a set of modules. Typically, an enterprise may deploy thousands of applications using hundreds of templates of software bundles, and configurations are periodically updated by the provider of the extensible PaaS organization to incorporate, for example, updated security settings for the enterprise, new requirements, new secure default parameters or new features. However, changes in one or more templates of a software bundle can cause the corresponding set of modules to be misconfigured and may eventually affect many applications deployed by the enterprise which are using that specific software bundle.

Figure 1:
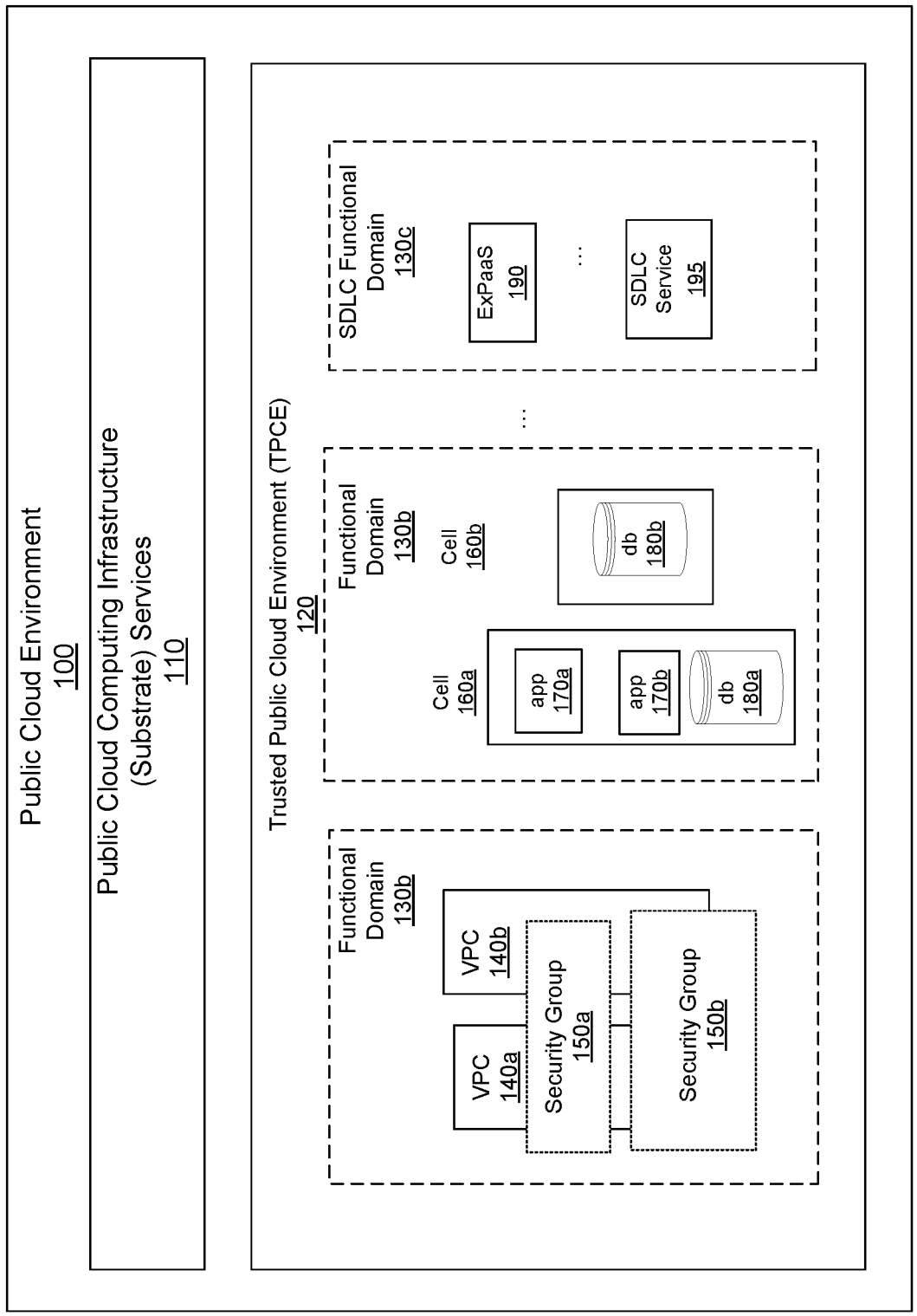
FIG. 1 depicts a block diagram illustrating functional blocks for a trusted public cloud environment that leverages a widely available public cloud environment, according to one embodiment.

The figures depict various embodiments for purposes of illustration only. One skilled in the art will readily recognize from the following discussion that alternative embodiments of the structures and methods illustrated herein may be employed without departing from the principles of the embodiments described herein. The figures use like reference numerals to identify like elements. A letter after a reference numeral, such as "130a," indicates that the text refers specifically to the element having that particular reference numeral. A reference numeral in the text without a following letter, such as "130," refers to any or all elements in the figures bearing that reference numeral.

DETAILED DESCRIPTION

As described herein throughout the remainder of the specification, an application may be composed of application source code (e.g., core business logic) and infrastructure configuration for managing and provisioning the underlying infrastructure that the application will be deployed on. In particular, while means of configuring the infrastructure may be hidden to application developers in existing PaaS systems, the exPaaS system described herein may provide various interfaces and tools that allow an application developer to configure the underlying infrastructure for one or more applications. In this manner, the application developer may have varying degrees of control over the infrastructure configuration.

In one embodiment, an exPaaS system may be composed of a collection of software modules that are each a proxy to one or more aspects of the underlying infrastructure. A software module may be configured, and therefore, the infrastructure the software module is a proxy for, may be configured using a respective template for deploying a given application. A collection of software modules may be configured together using a software bundle including the collection of templates for configuring the respective collection of software modules. In one embodiment, software bundles may be available to the many users of the exPaaS system in a marketplace. Through the exPaaS system API's, an application developer can provide a set of inputs (e.g., default or custom parameters) to the exPaaS system for configuring a set of software modules that configure the underlying infrastructure including, for example, pipeline for continuous integration (CI), pipeline for continuous delivery (CD), security, monitoring, infrastructure as code (IaC), and the like.

Large enterprises have several software application developers who are using different software bundles provided by the marketplace, hosted by the extensible PaaS to build different kinds of applications. The software bundles also have complex SDLC processes including various phases such as planning, analysis, design, development, testing, implementation, deployment, maintenance, as well as day to day operations such as releasing new versions of software bundles to production. One of the steps in the software development life cycle of software bundles that include a set of configurations for a set of modules is upgrading them to newer versions. However, changes in one template of a software bundle can cause the software bundle to be in a broken state for the entire set of modules that are configured by the software bundle and may eventually affect the many applications deployed by the enterprise which are using that specific software bundle.

The system (in this case, extensible PaaS), according to various embodiments, receives indications that changes are made to one or more templates which are referenced by one or more software bundles stored in an extensible PaaS marketplace and coordinates how changes to a particular template or software bundle will be applied to large number of applications for an enterprise system. Responsive to receiving an indication that a particular template has been updated, the system may determine applications that are configured using that particular template or software bundles including the particular template. The system determines a plurality of application groups within the set of identified applications that indicates a sequence in which the updates will be applied to the applications. The system configures one or more test applications with the updated changes in a development environment. Responsive to verifying that the updated changes are successfully incorporated by verifying the successful test runs for these software bundles in the test applications, the system configures applications with the updated software bundles in the production environment, specifically according to the ordering determined for the plurality of application groups.

In one embodiment, the changes are first applied to a first application group, upon successful application of the changes to the first application group and determining that all applications in the first application group are healthy, the exPaaS system automatically and slowly progresses the changes to other applications in a second application group, and so on, until all applications using the particular software bundle have been updated. The system may repeat this process as the system receives additional indications that other templates are updated. In this manner, template updates can be automatically and systematically deployed to applications without significant involvement by users of the PaaS system.

Overall System Environment

Conventional PaaS systems are based on a cloud computing model where hardware and infrastructure configurations needed for application development may be provided to the application developers by the PaaS provider or infrastructure provider, leaving them free to focus on the application-specific logic development without addressing other SDLC process needs. One difficulty is that in existing PaaS systems, the infrastructure configuration is hidden from developers and not extensible or configurable. However, since underlying infrastructure modules may constantly evolving, developers may still need to address a multitude of issues during SDLC processes in the course of developing the specific application-specific logic and shipping the resulting code to production.

While application developers may be responsible for the SDLC of the core logic (e.g., core business logic), the PaaS system may be responsible for the SDLC of the infrastructure configurations. Embodiments described herein describe an extensible PaaS system that performs automatic updates to configurations specified by templates and software bundles. Specifically, the exPaaS system described herein can easily manage the SDLC process of the infrastructure configuration using software bundles and templates, and moreover, an automated upgrade process using application groups that do not break the applications of the developers.

FIG. 1 shows a block diagram illustrating a trusted public cloud environment (TPCE) 120 that leverages an available public cloud environment (PCE) 100, in accordance with one embodiment. Public cloud environments 100 are owned and operated by third-party providers, and the hardware, software, and supporting infrastructure is also owned and managed by the third-party cloud provider. Examples of public cloud environment 100 include, for example, Amazon Web Services™ (AWS™), Google Cloud Platform™ (GCP™), Azure™, etc.

A public cloud environment 100 offers a range of public cloud computing infrastructure services 110 that may be used on demand by a trusted public cloud environment 120. Examples of the public cloud computing infrastructure services include servers, storage, databases, networking, security, load balancing, software, analytics, intelligence, and other infrastructure service functionalities. These infrastructure services may be used by the trusted public cloud environment 120 to build, deploy, and manage applications in a scalable and secure manner. The trusted public cloud environment 120 is a trusted public cloud architecture with processing resources, networking resources, storage resources, and other service functionalities with security boundaries that are strictly enforced. An example of a trusted public cloud environment 120 is a datacenter with defined and strictly enforced security boundaries.

The trusted public cloud environment 120 has specific attributes, in accordance with some embodiments. These attributes include attributes required to use available public cloud infrastructure services 110, for example region-specific attributes or environment type specific attributes. Further attributes support security needs, availability expectations, architectural agility coupled with reliability, developer agility, distributed capabilities, and the ability to perform on multiple available public cloud environments.

The trusted public cloud environment 120 may comprise of various instances TPCEI (trusted public cloud environment instances) 125a, 125b, . . . etc. For example, the various instances may be regional instances such as US-west and US-east, in each of which service owners may run multiple copies of applications to provide for redundancy requirements.

The trusted public cloud environment 120 (or each instance TPCEI 125) may support multiple functional domains 130a, 130b, . . . , 130n. Each functional domain (FD) 130 represents a set of capabilities and features and services offered by one or more computing systems that can be built and delivered independently, in accordance with one embodiment. A functional domain 130 may also be viewed a set of cohesive technical/application-specific use-case functionalities offered by one or more computing systems. A functional domain 130 has strictly enforced security boundaries. A functional domain 130 defines a scope for modifications. Thus, any modifications to an entity—such as a capability, feature, or service—offered by one or more computing systems within a functional domain 130 may propagate as needed or suitable to entities within the functional domain but will not propagate to an entity residing outside the bounded definition of the functional domain 130.

Each functional domain 130 may contain multiple virtual private cloud (VPC) networks, 140a, 140b, . . . , etc. Each virtual private cloud 140 is an on-demand pool of shared resources that are allocated within the functional domain 130 and provide a level of isolation between the users using the resources. VPCs within a functional domain residing within a single public cloud environment may establish connectivity with each other using native multi-VPC network connectivity capabilities available to them via underlying networking infrastructure. For example, native options for multi-VPC network connectivity capabilities include inter-region VPC peering for Amazon Web Service™, inter-region VNet peering for Azure™, and Global VPCs for Google Platform Services™. Connectivity may be provided to two VPCs residing within different PCEs through VPNs. Each functional domain 130 may also contain multiple security groups, 150a, 150b, . . . , etc. Each security group 150 represents a declarative model for enforcing network segmentation. Each security group 150 includes entities with similar risk service profiles collected into a single security group with explicit declarative policy brokering connectivity between the groups.

A functional domain 130 may also contain one or more cells, 160a, 160b, . . . , etc. A cell 160 represents a collection of services that scale together, and that may be sharded. These services may be applications 170a, 170b, . . . , etc., and/or databases 180a, 180b, . . . , etc. The applications 170a, 170b, . . . , may individually be developed using embodiments of an extensible PaaS system 190.

In embodiments described herein, an instance of the trusted public cloud environment instance TPCEI 125 may each have an extensible PaaS system, running within TPCE (trusted public cloud environment) instance. In an embodiment, a copy of the extensible PaaS system is executed that deploys applications which can run in development, test, and production environments. This configuration happens in their continuous delivery pipelines using the API. Some embodiments may run multiple copies of the extensible PaaS system. The extensible PaaS system 190 may run in a specific functional domain (FD), for example an SDLC functional domain (or control FD) 130c. The SDLC functional domain 130c represents a group of services that support SDLC including extensible PaaS system 190 and other SDLC services 195. A system administrator or a service owner may specify a functional domain in which the extensible PaaS system is run.

A use-case workflow example of some embodiments of the extensible PaaS system is described below. This is followed by a description of the architecture of embodiments of the extensible PaaS system. Following the architecture description is a description of a flowchart of some of the processes executed by embodiments of the extensible PaaS system described herein.

Extensible Platform-as-a-Service System—A Workflow Example

Figure 2A:
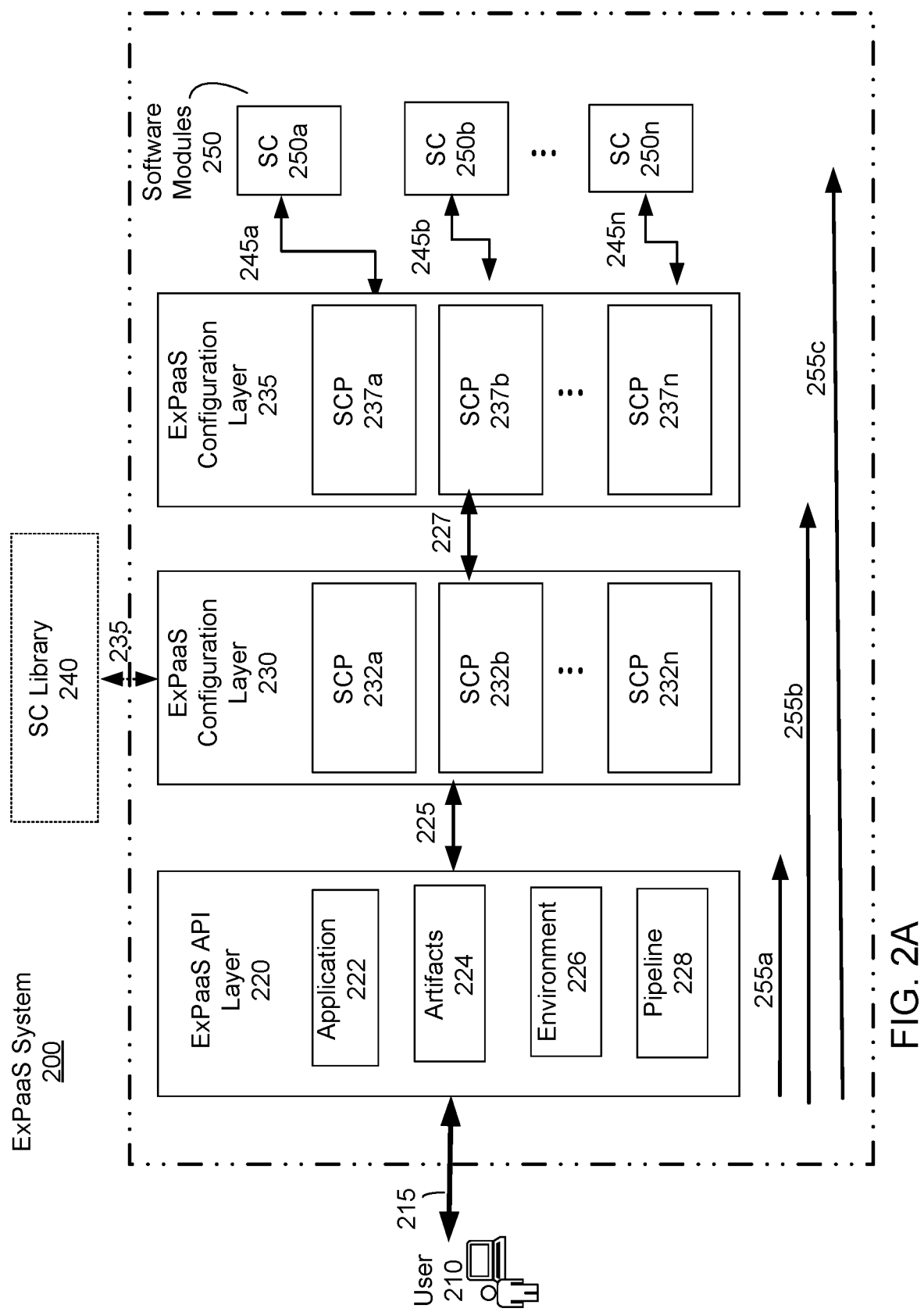
FIG. 2A depicts an exemplary workflow illustrating use of an extensible PaaS system, according to one embodiment.

FIG. 2A depicts a workflow example of using the extensible PaaS system 200, such as exPaaS system 190 as depicted in FIG. 1, in accordance with one embodiment. The example shown in FIG. 2A may be performed in trusted public cloud environments such as trusted public cloud environment 120 that resides within a public cloud environment such as public cloud environment 100 depicted in FIG. 1.

In some embodiments, the exPaaS system 200 includes an exPaaS API layer 220, an exPaaS configuration layer 230, an SC library 240, and a set of underlying software modules 250 (e.g., a configured Git™ repository, basic program templates in a default language such as Java™, a configured Helm™ chart for creating containerized applications). A user 210 may be an application developer who interacts 215 with the exPaaS system 200 using an application programming interface (API) that is presented by the exPaas API layer 220.

The exPaaS API layer 220 presents an API to the user 210. Conventional systems have only one PaaS API layer, for example, the layer 220. In contrast extensible PaaS system has multiple layers, for example, layers 230 and 235 in addition to layer 220. The inner layers 230 and 235 of the exPaaS system allow users to expose more complexity of software modules 250 being configured. For example, the user 210 may start with a simple configuration based on exPaaS layer 220 where most of the configurations of the software modules 250 are based on default values and a minimal amount of configuration is exposed by the exPaaS layer 220. A user that wants to expose and modify more details of a particular module, for example, software module 250a may use the inner exPaaS configuration layer 230 for software module 250a but may continue to configure the remaining software modules using the top level exPaaS API layer 220. At a later stage, the user may want to expose and modify more details of another module, for example, software module 250b and may use the inner exPaaS configuration layer 230 for software module 250a as well as 250b but may continue to configure the remaining software modules using the top level exPaaS API layer 220. At some stage, the user may want to expose and modify even more detailed configurations of a software module, for example, 250a. The user may accordingly use the exPaaS configuration layer 235 for configuring software module 250a while using the exPaaS configuration layer 230 for software module 250b and continuing to use the exPaaS layer 220 for remaining modules, e.g., 250c, 250d, . . . 250n.

The presented API encapsulates a simplified abstraction model for automating SDLC processes during application development for the user 210 by exposing only a limited number of features from the set of all possible configurable features of the underlying platform software modules to the user 210. The user 210 may interact 215 with some of the following features in the presented API: application 222, artifacts 224, environments 226, and the pipeline 228. The application 222, artifacts 224, environments 226, and pipeline 228 together expose a set of limited configurable features associated with the user application to the user 210. These are used by the exPaaS system 200 to automatically configure the underlying software modules of the platform for use during the SDLC processes of the user application. In some embodiments, the API presented by the exPaaS API layer 220 may receive 215 values for the exposed features from the user 210. The values from the user may be in the form of source code, data such as name of the application, team name associated with the application developer, environments in which the application may reside (functional domain associated with the application, TCPE instances), code libraries, etc. The API may also receive queries and commands from the user 210 and display the responses to these queries and commands.

The exPaaS configuration layer 230 serves the simplified abstraction model represented by the exPaaS API layer 220 by automatically configuring the underlying software modules for use during the SDLC processes of a user application under development by the user 210. The exPaaS configuration layer 230 may be viewed as including a set of modules SCP 232a, SCP 232b, SCP 232n that act as proxy software modules with automatically configured configurations that are based on further underlying actual (yet to be configured) software modules 250, i.e., SC 250a, SC 250b, . . . , SC 250n, respectively. The automatically generated configurations generated at the exPaaS configuration layer 230 may be based on the received 225 data values for features from the user 210 at the exPaaS API layer 220. The exPaaS configuration layer 230 may also obtain 235 predefined, default, and security-approved templates from a software module library SC library 240. The required values for the exposed features of application 222, artifacts 224, environment 226, and pipeline 228 provided by the user 210 at the exPaaS API layer 220 and the templates obtained from the SC library 240 at the exPaaS configuration layer 230 are used by the exPaaS system 200 by individually configuring (245a, 245b, . . . , 245n) the software modules 250 to generate a platform of underlying software modules SCP 232 for use in the SDLC processes of the user application.

In addition to the above-described workflow that demonstrates use of a PaaS system to obtain a set of automatically configured underlying software modules during application development, the exPaaS system 200 further enables the user 210 to customize configurations for selected underlying software modules SC 250. This is described below.

The API presented by the exPaaS API layer 220 may receive queries and commands from the user 210. These queries and commands facilitate viewing, by the user 210, of a set of the underlying software modules 250 that form the platform of software modules for use during SDLC processes for application development. The set of the underlying software modules 250 that form the platform of software modules may be presented as a list of software modules to the user 210. The user 210 may select a subset of software modules (e.g., SC 250a and SC 250n shown in FIG. 2) from the presented list for custom configuration (i.e., the user 210 selects to not use the automatic/default configurations SCP 232a and SCP 232n for software modules SC 250a and SC 250n respectively, but instead chooses to actively customize software modules 250a and SC 250n as desired; however, the user will use the automatically configured SCP 232b for software module SC 250b).

The exPaaS API layer can be used to customize a subset of modules, for example, a single module, two modules, or more modules. The values of the parameters or attributes that are not customized are automatically determined by the system using best practices and safe default values. Furthermore, depending on the API layer of the exPaaS that is used, the degree of customization of each module may be different (or same). For example, a module SC 250a may be customized 255a using the exPaaS API layer 220 that allows minimal customization. Another module SC 250b or the module SC 250a at a later stage during the development may be customized 255b to a higher degree using the exPaaS API layer 230. Similarly, another module SC 250c or the modules SC 250a or 250b at a later stage during the development may be customized 255c to an even higher degree using the exPaaS API layer 235. The different degrees of customization are illustrated using the arrows 255a, 255b, and 255c.

The exPaaS API layer 220 subsequently may present APIs for receiving custom configuration data from the user 210 for the selected subset of underlying software modules (e.g., for software modules SC 250a and SC 250n). Thus, the exPaaS system 200 enables the user 210 to use the automatically configured SCP 232b along with the custom configured SC 250a and SC 250n during the SDLC processes of a user application under development. The exPaaS system 200 may enable the user 210 to move between using an automatically configured software module SCP 232 and a custom configured software module 250 at any time during the SDLC processes of a user application under development.

Example Workflow for Updates to Software Bundles Using exPaaS System

Figure 2B:
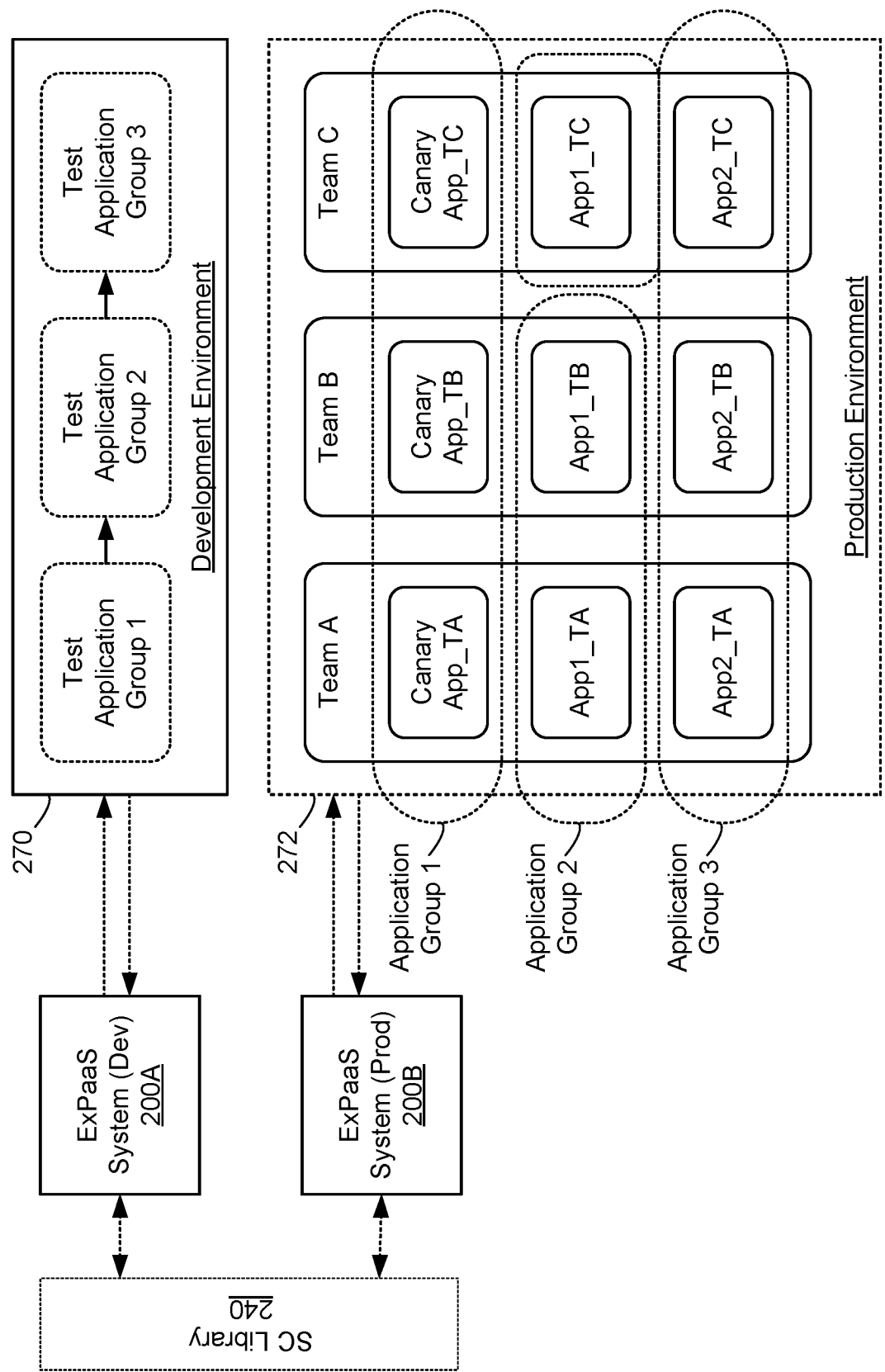
FIG. 2B depicts an exemplary workflow illustrating rolling out of updates to software bundles in an extensible PaaS system across, for example, thousands of applications, according to one embodiment.

FIG. 2B depicts an exemplary workflow illustrating deployment of updates to software bundles using an extensible PaaS system, according to one embodiment. The example shown in FIG. 2B may also be performed in trusted public cloud environments such as the trusted public cloud environment 120 that resides within a public cloud environment such as public cloud environment 100 depicted in FIG. 1.

As described in conjunction with FIG. 3A, the software bundle library SC library 240 stores one or more templates and collection of those templates called software bundles, that specify a set of predefined, default, and security-approved configurations for software modules 250. Typically, there is a one-to-one correspondence between a template and an underlying software module 250, and a template may be used to configure a respective software module 250. An application may be configured to use a specific software bundle. Also as described with respect to FIG. 3A, in order to deploy the application, components of the exPaaS system 200, such as the exPaaS configuration layer 230, may obtain templates from the software bundle library SC library 240, as specified in the software bundle configured for the application, to individually configure respective software modules 250 for use in the SDLC processes.

Specifically, applications and infrastructure provisioned by the applications within an enterprise may follow specific patterns. A template or a collection of templates (called a software bundle) can be used to encode these patterns and can be easily discovered and instantiated by a user (e.g., user 210 in FIG. 2A) of the exPaaS system 200. Moreover, templates can make it easier for new applications to follow well-defined path patterns, and thus, applications can be created more easily by using templates since the applications will obtain security approval more easily (e.g., by using pre-approved templates) and by design, will be more secure and robust. Examples of one type of templates used for application provisioning on containerized infrastructure may be Helm™ templating or JSONNET templating. A template may be associated with a set of attributes, such as name, template type, provider, owner, version, and the like. Specifically, the template type specifies what type of module in the exPaaS system, the template is designed to configure. A more detailed description is provided in conjunction with the data store 340 of the exPaaS system 300 of FIG. 3.

Moreover, since applications deployed by the enterprise are typically configured with more than one template, the exPaaS system 200 may also manage software bundles, where a software bundle includes a collection of templates used for creating and deploying one or more applications. An application may refer to the individual templates themselves or a respective software bundle that includes a collection of templates for configuring the underlying software modules 250 for the application. Once applications which refer to templates or software bundles are instantiated, the templates may need to be updated over time due to, for example, new security requirements for the environment, new secure default parameters or values for the templates, or any vulnerabilities that need to be corrected. Once a version of a template has been updated, it can be associated with a new version, and the exPaaS system 200 may store them accordingly in the software library SC library 240.

Typically, the enterprise exPaaS system may deploy thousands of applications using hundreds of templates or software bundles at a time. Since templates work in consonance together to achieve the desired goal state of applications, an error in a template update can cause problems in an entire software bundle. Thus, it is important that the updates are tested as a unit (i.e., as a software bundle) and that specific versions of the templates are tested before applications in production get updated with a newer version of those templates. Thus, in one embodiment, the workflow shown in FIG. 2B provides a method for the exPaaS system 200 to successfully integrate updates to templates or software bundles in an automated and systematic manner, without significant (e.g., in most cases zero) involvement by users of the exPaaS system 200, whose primary goal may be to launch applications without having to be concerned about manually incorporating updates to configurations of the software modules 250.

As shown in FIG. 2B, in one embodiment, a first instance of the exPaaS system 200A that is a development version of the exPaaS system 200 can be used for deploying applications in a development environment 270. A second instance of the exPaaS system 200B that is a production version of the exPaaS system 200 can be used for deploying applications in a production environment 272. In one embodiment, each of the development environment 270 and the production environment 272 may correspond to a respective cell 160 of a functional domain 130, as described in conjunction with the example TPCE 120 of FIG. 1.

In one embodiment, the exPaaS system 200 may receive indications that changes have been made to particular templates or software bundles stored in the software library SC library 240. Thus, the software library SC library 240 acts as a marketplace for different templates and software bundles for configuring infrastructure. For example, the exPaaS system 200 may receive an indication that changes have been made to one or more templates that in turn, may affect respective software bundles of the software library SC library 240. For example, the exPaaS system 200 may receive an indication that a set of changes have been made to a particular template to update security configurations for the underlying software module 250 of the template. As an example, the indication may include the names of the one or more templates and new version numbers of each of the updated templates.

The production environment 272 of the TPCE 120 may be dedicated to hosting applications and services that are in production and that receive and respond to user traffic. In one embodiment, applications in the production environment 272 are arranged with respect to different units of the enterprise, where each unit is responsible for developing and managing a set of respective applications. For example, each unit may correspond to a respective team, department, or suborganization of the enterprise that serve a dedicated function within the enterprise. For example, an example team may be responsible for providing machine learning operations services for the enterprise and may be responsible for managing applications for performing these operations.

In the example shown in FIG. 2B, the production environment 272 includes applications for three teams of the enterprise, Team A, Team B, and Team C. However, in reality, the production environment 272 can host applications for many more teams or units. In the example shown in FIG. 2B, each team deploys three applications—specifically, Canary App_TA, App1_TA, and App2_TA for Team A, Canary App_TB, App1_TB, and App2_TB for Team B, and Canary App_TC, App1_TC, and App2_TC for Team C.

In particular, each unit may configure applications of the unit using a specific software bundle. For example, Team A, Team B, and Team C may configure each application using software bundle A. Team A, Team B, and Team C may have more applications that may be using different software bundles, such as software bundle B or software bundle C. However, embodiments are not limited thereto, and each team may have applications other than those shown in FIG. 3B that are configured using multiple, different types of templates or software bundles.

In one embodiment, each unit is also responsible for deploying canary applications in the production environment 272 that are each representative of one or more applications of the unit which are using the same software bundle A. A canary application may be configured using the same software bundle or template used by one or more applications of the unit and may include features unique to these applications. For example, software bundle A used to configure App1_TA and App2_TA for Team A may include a custom template that is designed and is unique to applications App1_TA and App2_TA. The canary application Canary App_TA may be an application that includes similar services and functionalities to App1_TA or App2_TA and is configured using the same software bundle (e.g., software bundle A) that includes the unique features. While not shown in FIG. 2B, a second set of applications for Team A may also be deployed that use a software bundle different from software bundle A, and a respective canary application for the second set of applications may also be deployed, and so on. Similarly, Team B deploys Canary App_TB representative of App1_TB and App2_TB, and Team C deploys Canary App_TC representative of App1_TC and App2_TC.

Responsive to receiving an indication that one or more changes are made to a particular template, the exPaaS system 200 determines applications that are configured with the particular template or with software bundles including the template. For example, the exPaaS system 200 may receive an indication that one or more changes are made to a template AppSource for configuring a Git™ repository for application source code. The previous version may be version 0.18 and the updated version may be version 0.19. For the sake of illustration, each of the applications shown in FIG. 2B are configured with software bundles (i.e., software bundle A) that all include the particular template for update. Specifically, prior to applying the updates, the applications in the production environment 272 may be configured with the settings in the 0.18 version (previous version) of the template. In reality, the production environment 272 may include many other applications that are configured with templates or software bundles that do not include the particular template or software bundle.

The exPaaS system 200 assigns each of the one or more applications to a respective application group to determine a plurality of application groups. The exPaaS system 200 determines an ordering of the plurality of application groups for applying the one or more changes of the particular template or software bundle. In one embodiment, like the example shown in FIG. 2B, the exPaaS system 200 may update changes with respect to a particular software bundle (e.g., software bundle A in FIG. 2B), and each identified application using the particular software bundle for update is assigned to a respective application group for that change. In another embodiment, the exPaaS system 200 may update changes with respect to a particular template or a group of similar templates will be updated with similar changes, and the set of identified applications using the particular template may use the same or different software bundles (but that each include the particular template or the group of templates). In such an embodiment, each identified application using a software bundle including the particular template for update is assigned to a respective application group, and thus, one application group may include applications that use the same or different software bundles that include the particular template or group of similar templates.

In one embodiment, the first application group is the group of canary applications across different units. The exPaaS system 200 may subsequently determine different application groups where applications in each group will be rolled out with the updated template together. In the example shown in FIG. 2B, the first application group includes Canary App_TA, Canary App_TB, and Canary App_TC. The second application group includes App1_TA and App1_TB. The third application group includes App1_TC, App2_TA, App2_TB, and App2_TC. While the example shown in FIG. 2B illustrates applications that use the same software bundle A, when the exPaaS system 200 determines to roll out changes to a particular template, each application group may include applications that are configured using different software bundles (but each include the same particular template for update).

In one embodiment, before the updated template is deployed to applications in the production environment 272, test versions of these applications are deployed in the development environment 270. A test version of an application may be representative of a corresponding application in the production environment 270 but serves internal testing and verification purposes and may not process user requests itself. The first exPaaS system 200A applies the updated configurations to the test versions of the applications in the development environment 270 using a plurality of corresponding test modules. Responsive to receiving an indication that the updates are verified in the applications, the development instance of the exPaaS system 200A provides the verification to the second exPaaS system 200B. On the other hand, if the development instance of the exPaaS system 200A receives one or more errors, the exPaaS system 200A provides the indication to the developer of the software bundle or template being tested, such that the errors can be investigated and corrected.

In one embodiment, the test versions of applications in the development environment 270 are also grouped according to the determined ordering of the plurality of application groups, and the updates are rolled out according to the determined ordering of the application groups. For example, the development environment 270 may include a first test application group including test versions of Canary App_TA, Canary App_TB, and Canary App_TC, a second test application group including test versions of App1_TA and App1_TB, and a third test application group including App1_TC, App2_TA, App2_TB, and App2_TC. The first exPaaS system 200A may update the configurations specified by the new version of the template or software bundle according to the determined ordering of the application groups. In this manner, applications within a group are updated with the changes at the same time. In the example shown in FIG. 2B, the first exPaaS system 200A may deploy the updates to the first test application group, then the second test application group, and then the third test application group.

Responsive to receiving an indication that the changes are verified in the development environment 270, the production instance of the exPaaS system 200B may apply the updates in the production environment 272 according to the determined ordering of the application groups, such that applications within an application group receive the changes at the same time. In the example shown in FIG. 2B, the production instance of the exPaaS system 200B may change the configuration for the first application group according to the updated template. Specifically, the first application group may include the canary applications that do not process user requests, such that the updates can be tested on these representative applications before the end-user interacts with the respective application and are thus less dangerous to test these changes without causing applications to be in a broken state across many units or teams. The production instance of the exPaaS system 200B then updates the second application group, and then updates the third application group.

As described in detail above, an application group may be specific to the same software bundle or a set of software bundles with similar templates or changes. Moreover, because different changes or type of changes to software bundles or templates can be used to create a respective set of application groups dedicated to rolling out that change, one application can technically belong to multiple application groups. For example, the same application using a particular software bundle including a first template and a second template may belong to an application group for rolling out changes to the first template and another application group for rolling out changes to the second template at a same or later time.

Thus, each application group acts as a virtual zone, where any breaks or errors created by the updates are limited to that group of applications before being propagated to other applications in subsequent application groups. A change generally starts with the first application group and then moves onto subsequent application groups sequentially. When the first application group are the canary applications, the changes are applied to applications that are representative but if broken, have least or almost no impact to applications in production and help catching broken changes before these changes cause technical difficulties in production.

The process described above may also be repeated for updates to other types of templates or software bundles by determining the respective applications that are configured with a particular template or software bundle, determining the application groups for applying the updates, verifying that the changes are successfully applied for test versions of applications in a development environment 270, and applying the updates according to the determined ordering of the application groups responsive to the verification. For example, in one instance, the exPaaS system 200 may determine predetermined application groups for each set of templates and software bundles, resulting in a "mesh" of application groups that cross each other across different applications and units (e.g., teams) within the organization. The process described with respect to FIG. 2B allows updates to templates or software bundles to be automatically and successfully deployed without significant involvement by a user 210 of the exPaaS system 200 in a seamless manner. The exPaaS system can be further extended to automatically and more intelligently determine application groups in response to changes and there may be multiple rollouts in progress across the mesh of application groups and the system could try to reduce or minimize changes to applications by combining multiple changes into single sets of application groups, thus causing least disruption to applications which are part of multiple such rollouts.

System Architecture

Figure 3:
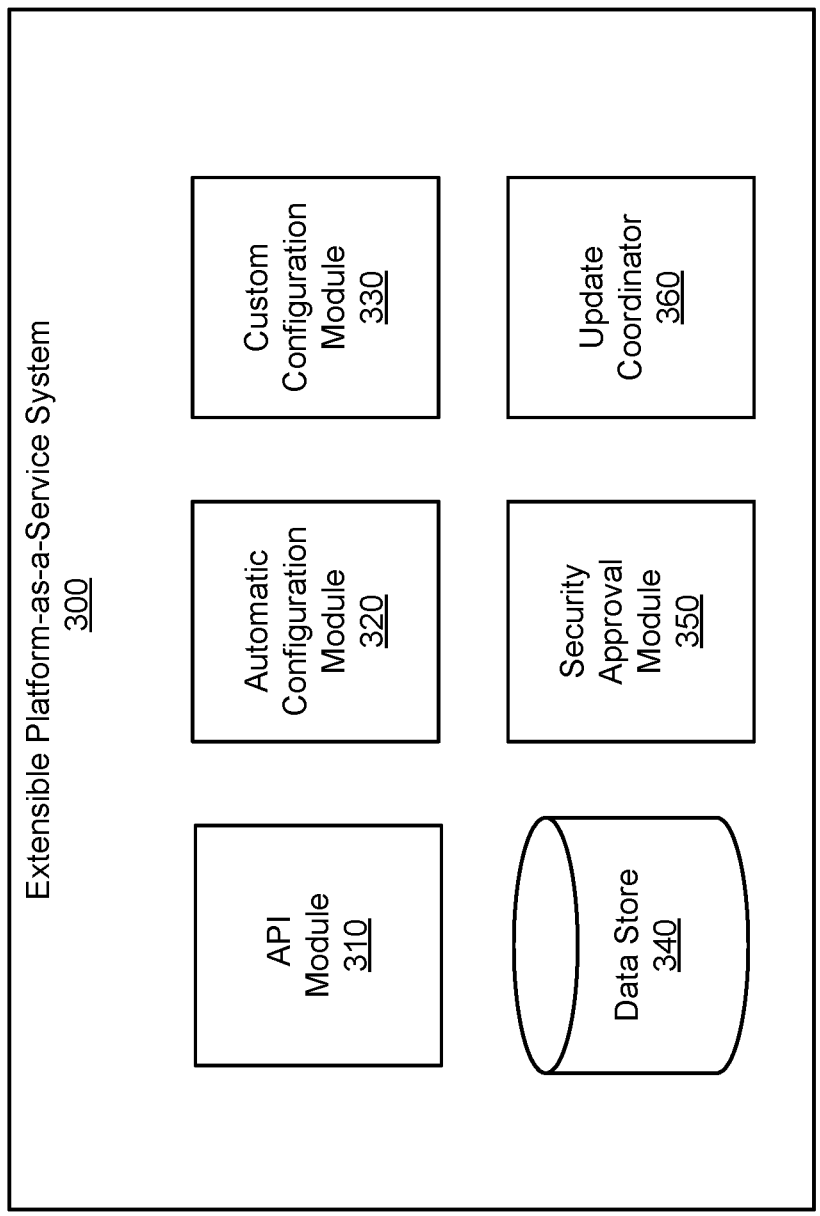
FIG. 3 is a block diagram illustrating modules of an extensible PaaS system, according to one embodiment.

FIG. 3 is a block diagram illustrating modules of the extensible PaaS system 300 according to one embodiment. The extensible PaaS (exPaaS) system 300 includes an API module 310, an automatic configuration module 320, a custom configuration module 330, a data store 340, a security approval module 350, and an update coordinator 360. Alternative configurations of extensible PaaS system 300 may include different and/or additional modules. Functionality that is indicated as being performed by a particular module may be performed by other modules than those indicated herein. Furthermore, steps of any processes described herein can be performed in an order different from that illustrated herein.

The modules of exPaaS system 300 may execute in a trusted public cloud environment such as a trusted public cloud environment 120 that resides within a public cloud environment such as public cloud environment 100 depicted in FIG. 1. The exPaaS system 300 may be used to perform the operational functionalities described in FIGS. 2A-2B as being performed by the exPaaS system 200. Instances of the exPaaS system 300 may reside and execute in instances of the trusted public cloud environment such as TPCEI 125 depicted in FIG. 1. Instances of the exPaaS system 300 may be executed by service owners in various environments such as a testing environment and a production environment, etc.

The API module 310 presents an API to a user (e.g., user 210 in FIG. 2). In some embodiments, the API module 310 enables the user to interact with a limited set of features of a simplified abstraction model for the underlying platform of software modules to be used in the SDLC processes during development of a user application. Some of the features in the simplified abstraction model that are exposed to the user through the API include: application (i.e., source code of the application), artifacts (of the application), environments (in which the application may exist), and the pipeline (defining the flow of the artifacts in the environments). The features in the simplified abstraction model exposed to the user through the API represent a small number of the set of all possible configurable features of the underlying platform software modules that may be used during the SDLC processes of the user application. The API module 310 enables the exPaaS system 300 to receive values for these limited set of features from the presented API to the user. The values received from the user may be in the form of, e.g., source code, data such as name of the application, team name associated with the application developer, environments in which the application may reside (functional domain associated with the application, TCPE instances), code libraries, etc. The API may also display, based on the values received for these features, the set of underlying software modules for use during SDLC processes of the user application. The API may also receive one or more requests, queries, and commands from the user and display the responses to these queries and commands. For example, a request from the user may be to display the set of underlying software modules that may be used by the exPaaS system 300 during the SDLC processes of the user applications. Such a request may specify a phase of the SDLC of the user application that the user may be interested in. For example, the user may request to view the underlying software modules that will be used during the "deployment" phase of the SDLC of the user application. In response, among other relevant software modules, the API module 310 may display the Helm™ chart available for use by the user.

The interactions with the exPaaS system are performed using the exPaaS APIs. Various interfaces may be used to invoke APIs exposed by the exPaaS system, for example, graphical user interface or command line interface. For example, the API module 310 may enable a user to use a command line interface (CLI) to invoke and execute the APIs of the exPaaS system 300. For example, a user may invoke and execute a command "expaasctl" along with associated commands and arguments in order to execute an instance of the exPaaS system 300. Some examples of commands that may be used with the CLI may include those shown in Table 1. These commands may further include options (not shown).

TABLE 1

| ExPaaS System - CLI Commands | |
| --- | --- |
| create | create an expaas-based user application from an application name |
| update | update configuration for an expaas-based user application |
| list | list all current expaas-based applications |
| showconfig | print configuration of a specific expaas application |
| show modules | display module metadata for a specific expaas-based application |
| show environments | display target environments of a specific expaas-based application |
| edit | edit expaas-based application configuration |
| . . . | . . . |

An example of the usage of the CLI to invoke and execute the expaasctl command is the following:

>expaasctl app create pvt-messaging –t "pvt-platform"

The command creates an application named "pvt-messaging" The –t option may be used with the create command to specify that the user belongs to a particular team "pvt-platform."

Other commands may be used to invoke and execute certain aspects of the exPaaS system 300, including commands to display the set of underlying software modules/components forming the extensible PaaS for the user application, display the environments for the user application, show a configuration for a specific user application, etc. The API module 310 may facilitate the user to query and obtain information about various aspects of the exPaaS system 300 and bring transparency to the user regarding the exPaaS system 300. The API module 310 may execute commands from the user to view a set of the underlying software modules, and in response display a list of software modules. The exPaaS system provides visibility into the defaults and the configurations generated by the system for the underlying modules. The ability to view the defaults allows users to inspect the available possible parameters that can be modified to customize the modules. Accordingly, the exPaaS system allows users to inspect the configurations of modules. In some embodiments, the system provides different modes of inspection. For example, certain mode of inspection may show only the key configuration parameters, another mode of inspection may show a larger set of configuration parameters, and a third mode of inspection may show all configuration parameters. Users may select the mode of inspection depending on their level of sophistication and understanding of the system and the extent to which they want to customize the system.

The API module 310 may receive a selection of software modules from the user that may form a selection of software modules that the user would prefer to customize. The API module 310 may receive an indication from the user of a selection of software modules that will be partially configured by the user (i.e., only some features in these modules will be configured by the user). The API module 310 may forward the received indication to the automatic configuration module 320 and the custom configuration module 330. Subsequently, the API module 310 may receive instructions from the custom configuration module 330 regarding exposing features of the selected software modules for custom configuration by the user. The API module 310 may receive an indication from the user of a selection of software modules that will be replaced by corresponding user-provided software modules, i.e., custom versions of these software modules from the user (e.g., the user's customized Helm™ chart, the user's customized Spinnaker™ pipeline, etc.). The API module 310 may forward the received indication to the automatic configuration module 320 and the custom configuration module 330. Subsequently, the API module 310 may receive instructions from the custom configuration module 330 regarding uploading selected customized software modules from the user.

The automatic configuration module 320 represents a simplified abstraction model for automating SDLC processes during application development for the user. The module 320 automatically configures underlying software modules available for use by the user application during the SDLC processes. The automatic configuration is based on the values received for the exposed features of the simplified abstraction model (i.e., application, artifacts, environment, and pipeline) provided by the user. In addition, the automatic configuration module 320 may obtain templates from a software module library (e.g., SC library 240 in FIG. 2) that may be stored in the data store 340. In some embodiments, for example, the automatic configuration module 320 may provide the user with following configured software modules, such as:
- a configured Git™ repository—to track all changes made to files associated with the user application
- basic program templates in a default language such as Java™
- configured test programs that are security approved
- a configured Helm™ chart for creating containerized applications
- a configured Jenkins™ pipeline for CI
- a configured Spinnaker™ pipeline for CD
- etc.

For example, when the CLI command:
>expaasctl app create pvt-messaging –t "pvt-platform"
is executed, the automatic configuration module 320 automatically configures several features for the underlying software modules. An example of configured values for some features are shown below. The user may view configuration specifics by executing the showconfig command (see Table 1 and example below):
Show Configuration Example:
    >expaasctl app showconfig pvt-messaging
    appType: scone-app
    gusProductTag: Pvt-Messaging
    livenessProbe:
        containerPort: 7080
        path: /actuator/health/liveness
    org: my-service-org-name
    ports:
        name: http
        port: 7442
        type: Internal
        name: http-admin
        port: 7080
        type: Internal
    readinessProbe:
        containerPort: 7080
        path: /actuator/health/readiness
    replicas: 1
    repoName: pvt-messaging
    resourceLimits:
        cpuLimit: "8"
        cpuRequest: "4"
        memoryLimit: 16G
        memoryRequest: 16G
    teamEmail: pvtplatform@mycompany.com
    teamName: PVT Platform Similarly, the user may view environment specifics by executing the showenvironments command (see Table 1 and example below):
    >expaasctl app showenvironments pvt-messaging
    environments:
        environmentTargets:
            envtype-region: dev1-uswest
            functionalDomainInstance: cooperative-domain
            serviceInstances:
                cells:
                    instanceName: plat1
                    type: cooperative-domain-cell
                    instanceName: shar1
                    type: cooperative-domain-cell
                    instanceName: serv1
                    type: cooperative-domain-cell
            envtype-region: test1-uswest
            functionalDomainInstance: cooperative-domain
            serviceInstances:
                cells:
                    instanceName: pvt11
                    type: cooperative-domain-cell
                    instanceName: stmfa
                    type: cooperative-domain-cell
                    instanceName: stmfb
                    type: cooperative-domain-cell
                    instanceName: stmfc
                    type: cooperative-domain-cell
                    instanceName: stmu
                    type: cooperative-domain-cell
                    instanceName: stmpa
                    type: cooperative-domain-cell
            envtype-region: perf1-useast
            functionalDomainInstance: cooperative-domain
            serviceInstances:
                cells:
                    instanceName: perf1
                    type: cooperative-domain-cell One or more of the names, values, fields, and parameters shown in the above examples may be replaced by different names, values, fields, and parameters during the automatic configuration performed by the automatic configuration module 320 in various embodiments of the exPaaS system 300.

The automatic configuration module 320 may receive an indication from the API module 310 that the user has selected a subset of software modules for customized configuration. In one case, the automatic configuration module 330 may receive an indication that a selected subset of underlying software modules will be partially custom configured by the user. In this case, the automatic configuration module 320 may automatically configure only a partial set of features of selected software modules (i.e., the remaining features in these selected modules need to be custom configured by the user). In a second case, the automatic configuration module 320 may receive an indication that a selected subset of underlying software modules will be entirely replaced by the custom version of the selected subset of underlying software modules. In this case, the automatic configuration module 320 may not automatically customize any feature in the selected subset of software modules. The automatic configuration module 320 will ensure that the automatically configured modules are available for use during the SDLC processes of the user application.

The custom configuration module 330 facilitates customization of selected software modules for use during the SDLC processes of a user application by the user. The custom configuration module 330 may receive indications from the API module 310 that the user has selected a subset of underlying PaaS software modules for custom configuration.

In one case, the custom configuration module 330 may receive an indication that a selected subset of underlying software modules will be partially custom configured by the user. In this case, the custom configuration module 330 will instruct the API module 310 to expose features for the selected subset of underlying software modules to the user so that the custom configuration values may be received from the user at the API for any of the exposed features. Subsequently, the custom configuration module 330 will ensure that the selected subset of partially custom configured are fully configured—with the received custom configuration values from the user and with the remaining features automatically configured by the automatic custom configuration module 320.

In a second case, the custom configuration module 330 may receive an indication that a selected subset of underlying software modules will be entirely replaced by the custom version of the selected subset of underlying software modules. The custom configuration module 330 will instruct the API module 310 to enable the user to upload the selected customized software modules. Subsequently, the custom configuration module will integrate the uploaded customized software modules from the user unto the extensible PaaS for use during the SDLC processes of the user application.

In some embodiments, the custom configuration module 330 will enable the user to partially or entirely customize underlying software modules anytime during the SDLC processes of the user application. The custom configuration module 330 will ensure that the custom configured modules are available for use during the SDLC processes of the user application.

The data store 340 stores information for the exPaaS system 300. The stored information may include a library of underlying software modules (e.g., SC library 240 in FIG. 2) that are pre-configured and meet security standards. In some embodiments, the underlying software modules in the library may be tagged with phases of the SDLC processes of a user application where they may be used, and a software module in the library may be tagged with multiple phases, indicating use during the tagged SDLC phases. The stored information may include default parameter values for use by the automatic configuration module 320. The data store 340 may include the Git™ repositories in association with various user applications using the exPaaS system 300. In some embodiments, configurations of underlying software modules that have been customized by the user, such as a custom Helm™ chart, a custom Spinnaker™ pipeline, etc., may be stored in the data store 340 for use during the SDLC processes of the user application. In some embodiments, the underlying software modules may be tagged with, possibly overlapping, phases of the SDLC processes. In some embodiments, the custom configured software modules may be made available for use by other application developers.

The data store 340 is a memory, such as a read only memory (ROM), dynamic random-access memory (DRAM), static random-access memory (SRAM), or some combination thereof. In some embodiments, the various modules of the exPaaS system 300 may pass various data values directly to each other. In some embodiments, the various modules of the exPaaS system 300 may store data values in the data store 340 and retrieve data values as needed from the data store 340.

In some embodiments, the data store 340 includes a repository that stores software bundles that represent groups of pre-configured software modules. A software bundle may be reviewed and pre-approved by a security team. Accordingly, the exPaaS system provides pre-packaged and pre-configured software bundles that have already received security approval. If an application uses a software bundle that has security approval, the application does not need to go through the security approval process. For example, the system may automatically grant security approval to the application.

As discussed in conjunction with FIGS. 2A-2B, a software bundle stored in the repository of the data store 340 may include one or more templates. The data store 340 may also store the individual templates. An example template is shown below:

```
kind: template
metadata:
  annotations:
    app.com/templateURL: https://gzt.companyA.com/tem
    marketplace.companyA.com/auto-version: "r="
  name: app-source-multi-repo-nodejs-app
spec:
  defaultDestination: ./
  defaultVersion: "0.18"
  module:
    provider: multiRepo
    type: AppSource
  name: nodejs-app
  versions:
    templateURL:
    https://git.companyA.com/templates/tree/v0.18.X/
      version: "0.18"
    templateURL: ./files
    version: latest
```

Specifically, a template may be associated with a set of attributes including a name, an owner, a template type, a provider, a template URL, a version, and the like. A template may also have a default version specified, such that when an application or software bundle refers to a template only by name and no specific version is specified, the default version of the template is used. The example template above is used for configuring a template type of "AppSource" to configure the AppSource module of the ExPaaS system 200, and the provider is "multiRepo." As another example, a template may be of type "continuous delivery" for configuring a continuous delivery pipeline module, and the provider for this template may be "Spinnaker™" or "Tekton™." As yet another example, a template may be of type "continuous integration" for configuring a continuous integration pipeline module, and the provider for this template may be "CircleCI™" or "Jenkins™."

A template is associated with a set of specific configurations for configuring an underlying software module 250, and in one instance, the set of configurations for a template may be included as a URL in the template. For example, the example template above includes a "templateURL" field to download the actual configuration files for the AppSource module. The set of configurations for a template may be specific to the provider.

As discussed in conjunction with FIGS. 2A-2B, a collection of templates is a software bundle and represents a set of pre-configured software modules. An application may refer to templates or software bundles. An example format of a software bundle is shown below:

```
kind: SoftwareBundle
metadata:
    name: scone-app-blue-green-deployment
    namespace: armada-system
spec:
    description: Scone app with blue-green rollout strategy
    moduleMetadata:
        name: blue-green-scone-app
        templateName: blue-green-scone-app
        type: AppSource
        destination: ./helm-chart.generated
        name: blue-green-helm
        templateName: blue-green-deployment
        type: Helm
        config:
            blueGreenEnabled: true
        name: blue-green-cd
        type: CD
```

Specifically, the example software bundle is a collection of a first template of name "blue-green-scone-app" for configuring an AppSource module and a second template of "blue-green-deployment" for configuring a CD pipeline module.

The security approval module 350 either provides automatic security approval for applications being developed or assists with security approval of applications. The security approval module 350 also monitors applications during their SDLC stages and determines whether security approval is required for the application as a result of certain modifications made to the configurations of software modules used by the application. Further details of the system architecture of the security approval module 350 is provided in FIG. 5.

The update coordinator 360 receives indications from the data store 340 that changes are made to one or more templates or software bundles stored in the data store 340. The update coordinator 360 coordinates how the changes to a particular template or software bundle will be applied to the applications for the enterprise. Responsive to receiving an indication that a particular template has been updated, the update coordinator 360 may perform the steps described in conjunction with FIG. 2B, including determining applications that are configured using the particular template or software bundle, determining a plurality of application groups within the set of identified applications, and determining an ordering for the application groups for rolling out the update as discussed in detail above.

The update coordinator 360 of a development instance of the exPaaS system 300A may then coordinate with, for example, the automatic configuration module 320 or the custom configuration module 330 to deploy the test applications with the updated configurations in the development environment. Responsive to verifying that the updated changes are successfully incorporated in the test applications, the update coordinator 360 of a production instance of the exPaaS system 300B may then coordinate with the appropriate modules to deploy the production applications with the updated configurations in the production environment, specifically according to the ordering determined for the plurality of application groups. The update coordinator 360 may repeat this process as the update coordinator 360 receives additional indications that other templates are updated.

Process Executed by an Extensible Platform-as-a-Service System

Figure 4:
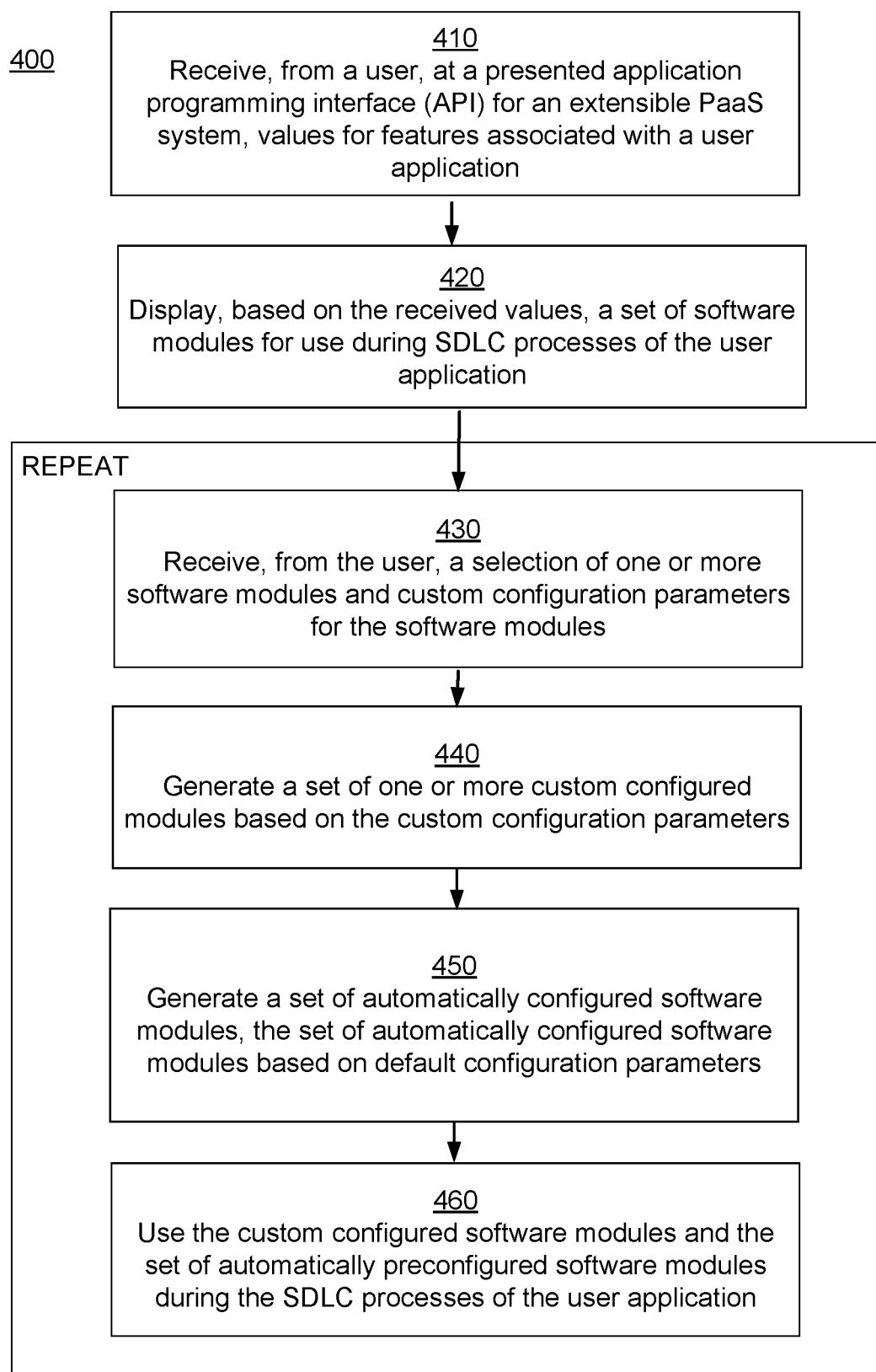
FIG. 4 is a flow chart illustrating the process for enabling a use of the extensible PaaS system, according to one embodiment.

FIG. 4 is a flow chart illustrating the overall process executed by an extensible PaaS system 300 (shown in FIG. 3) according to one embodiment. The process illustrated herein is performed by an instance of the exPaaS system 300. Various embodiments can perform the steps of FIG. 4 in different orders than those indicated herein. Moreover, other embodiments can include different and/or additional steps than the ones described herein. The exPaaS system 300 receives 410, from the user, values for one or more features exposed in an API that is presented to the user. The user may be an application developer who is developing a user application and who will use the exPaaS system 300 during the SDLC processes of the user application. The exposed features may be a limited set of features of a simplified abstraction model for the underlying platform of software modules to be used in the SDLC processes during development of the user application. In some embodiments, some of the features in the simplified abstraction model that are exposed to the user by the exPaaS system 300 may include: application, artifacts (of the application), environments (in which the application may exist), and the pipeline (defining the flow of the artifacts in the environments).

The exPaaS system 300 displays 420 a set of underlying software modules for use during the SDLC processes of the user application. This display may be based on the values received for the features in the simplified abstraction model. In some embodiments, the exPaaS system 300 may receive a request from the user to display the set of underlying software modules. In some embodiments, the user may additionally specify a phase of the SDLC for which the display is requested, and the displayed set of modules may be the software modules that will be used during the specified phase of the SDLC processes of the user application.

The exPaaS system 300 receives 430, from the user, a selection of one or more software modules for custom configuration from the displayed set of software modules. In some embodiments, each of the received selection of software modules may be accompanied by an indication of whether the user desires partial custom configuration of the selected software module or wishes to entirely replace the software module with a custom configured module.

The exPaaS system 300 generates 440 custom configured software modules for the received selection of one or more software modules. In some embodiments, when the received indication is that a module will be partially configured by the user, the exPaaS system 300 presents an API for the indicated software module, and receives, from the user, values for one or more features that are exposed in the presented API for the indicated software module. The system 300 generates the custom configured software module for the indicated module based on the received values from the user. In some embodiments, when the received indication is that a module will be replaced by a corresponding user-provided module (i.e., entirely configured by the user), the exPaaS system 300 presents an interface for uploading, by the user, the corresponding user-provided software module for the indicated software modules. Subsequently, the system 300 generates the custom module based on the uploaded software module.

The exPaaS system 300 generates 450 a set of automatically configured software modules for those modules in the displayed set of software modules that are not in the set of desired custom modules, i.e., the displayed set of software modules from which the received selection of one or more software modules (from the user) is removed.

The exPaaS system 300 uses 460 the set of custom configured software modules and the set of automatically configured software modules during the SDLC processes of the user application.

The processes described above can be implemented on different types of computer systems, including multi-tenant computer systems. In a multi-tenant computer system, multiple tenants share the use of a computer system, but without access or knowledge to each other's data or activities. Each tenant may be an enterprise. As an example, one tenant might be a company that employs multiple salespersons, where each salesperson uses a client device to manage their sales process. Thus, a user might maintain contact data, leads data, customer follow-up data, performance data, goals and progress data, etc., all applicable to that user's personal sales process.

Security Approval of Applications

Figure 5:
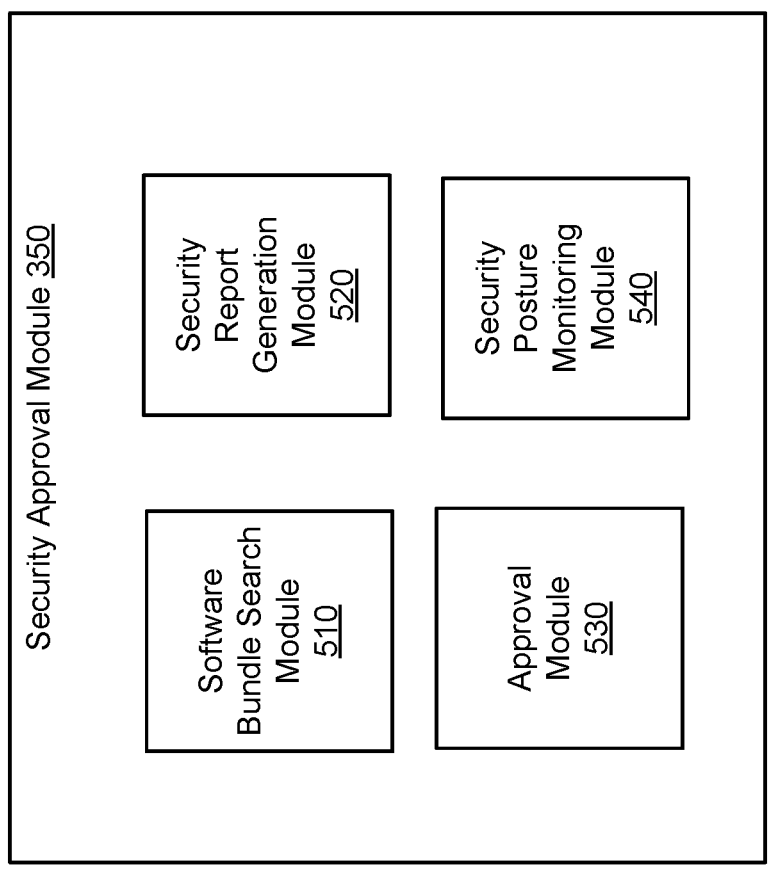
FIG. 5 is a block diagram illustrating system architecture of a security approval module, according to one embodiment.

FIG. 5 is a block diagram illustrating system architecture of a security approval module 350, according to one embodiment. The security approval module 350 includes a software bundle search module 510, a security report generation module 520, an approval module 530, and a security posture monitoring module 540. Alternative configurations of extensible PaaS system 300 may include different and/or additional modules. Functionality that is indicated as being performed by a particular module may be performed by other modules than those indicated herein. Furthermore, steps of any processes described herein can be performed in an order different from that illustrated herein.

The software bundle search module 510 allows users to search for relevant software bundles based on search criteria specified by the users. In an embodiment, the software bundle search module 510 presents users with attributes of the software bundles that the users can specify for filtering a subset of software bundles that can be used for an application being developed. For example, the user may be able to specify a type of file system access, a type of communication used by software modules, the version of software artifacts used, the programming language used for development, the type of application (e.g., web application, application with graphical user interface, online application, and so on), and other attributes. The software bundle search module 510 receives the search criteria and filters a subset of software bundles that satisfy the search criteria. An application developer may review the received software bundles to select a particular software bundle to use. The application developer may select a particular software bundle that satisfies most of the requirements but may perform reconfiguration of certain modules to meet additional requirements.

The approval module 530 reviews the selections of software bundles by the user for application development and determines whether all the software bundles selected by the user have security approval. If all software bundles used by the application have security approval, the approval module 530 may either give automatic security approval to the application or send a request for granting automatic security approval to a security team member.

The security report generation module 520 generates a report of the configurations used by an application, for example, for presenting to a security team member for review. The security report includes the information necessary for a security team member to review the application in view of security approval. For example, the security approval may include information describing the type of communication protocols used in the software bundles selected by the developer for the application, the attributes of file systems used by the software bundle, versions of software artifacts used in the software bundles and so on. If a user decides to customize a particular software module and customize the software module by reconfiguring it to suit the specific needs of the application, the security report generation module 520 includes information describing the customizations. Accordingly, the security report generation module 520 includes all the information needed by the security team to review the application to determine whether security approval can be granted.

The security posture monitoring module 540 monitors changes to the application during various SDLC stages. For example, a developer may start development with a software bundle that has security approval and as a result gets automatic security approval for the application. However, during the development process, the developer may customize a particular software module of the software bundle. The security posture monitoring module 540 tracks all such changes and if a change to the configuration is performed by the developer that requires further security approval, the security posture monitoring module 540 may alert the developer and/or the security team of the change. The security posture monitoring module 540 may further invoke the security report generation module 520 to generate a security report and provide it to a security team member for review. The security team member may review the generated report and determine whether the application should be granted security approval in spite of the customization of the component.

Figure 6:
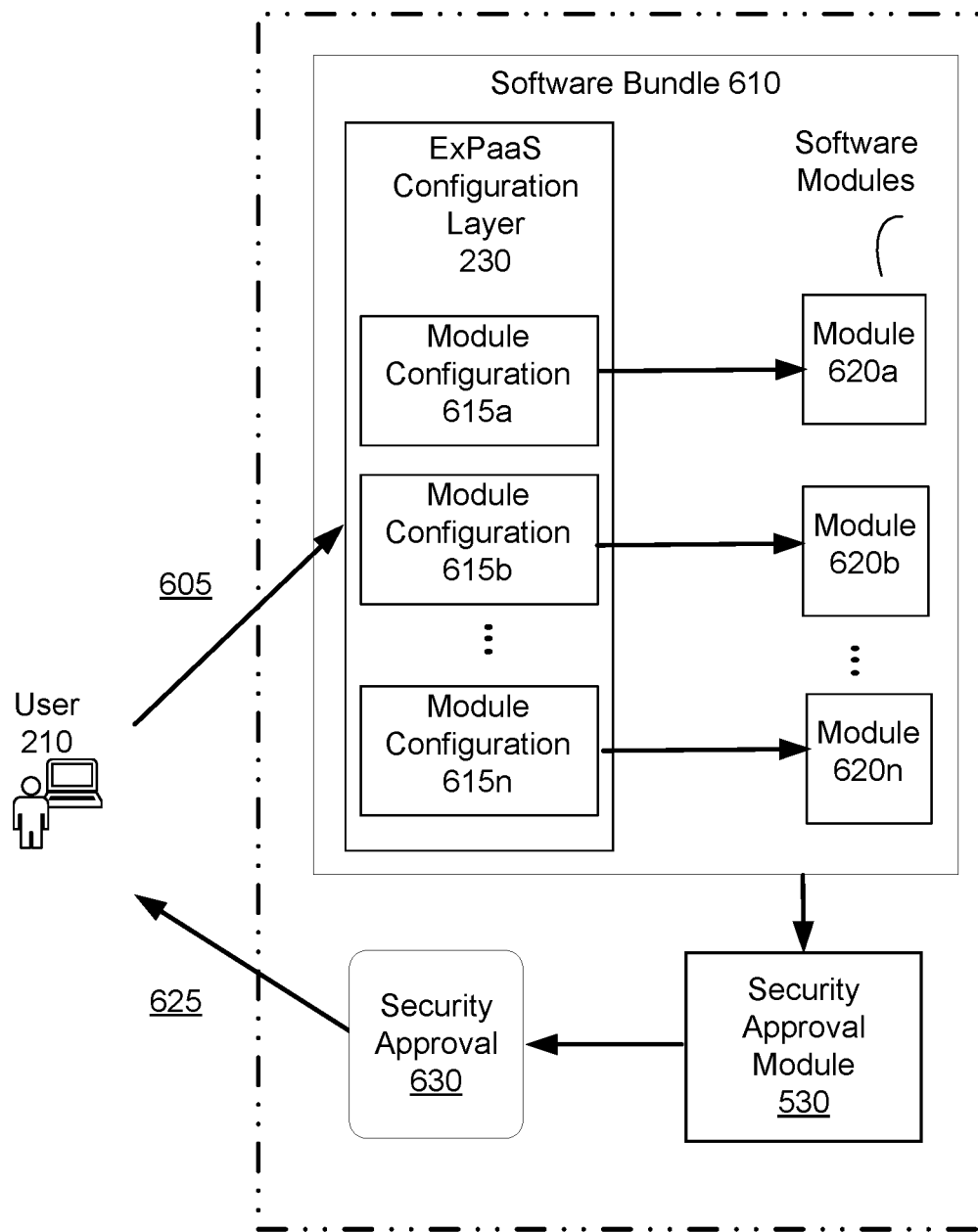
FIG. 6 illustrates the process of security approval for an application, according to an embodiment.

FIG. 6 illustrates the process of security approval for an application, according to one embodiment. FIG. 6 shows an example software bundle 610 that is used for development of an application. The software bundle 610 includes configurations of a set of modules. For example, the software bundle 610 shown in FIG. 6 includes software module configuration 615*a* for software module 620*a*, software module configuration 615*b* for software module 620*b*, and so on including software module configuration 615*n* for software module 620*n*. The example software bundle 610 shows software configurations that are all pre-approved for security purposes. The user 210, for example, a developer of an application identifies one or more software bundles for use for a new application being developed for a cloud platform and selects 605 the software bundle 610 for use. The security approval module 530 tracks the application being developed and determines whether all the software modules of the software bundle 610 being used have security approval. If the security approval module 530 determines that all the software modules of the software bundle have security approval, the security approval module 530 automatically grants 625 security approval to the application. Accordingly, the user 210 can proceed with the various SDLC stages for the application and taking the application to production.

Figure 7:
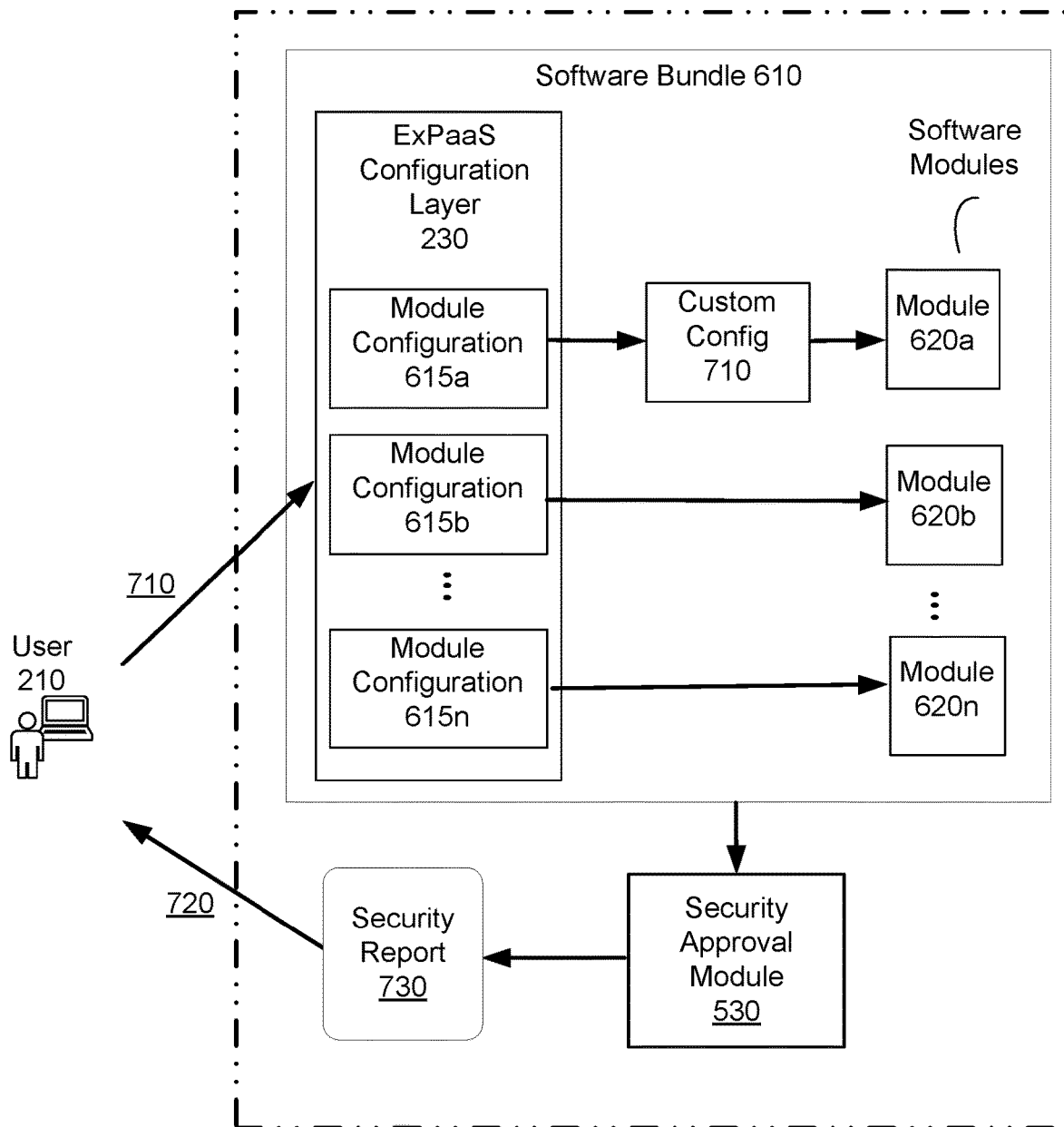
FIG. 7 illustrates the process of security approval for an application with custom configuration of one or more software modules, according to an embodiment.

FIG. 7 illustrates the process of security approval for an application with custom configuration of one or more software modules, according to an embodiment. The user, for example, the developer of an application may start with a configuration illustrated in FIG. 6. For example, the user may start development of the application using a software bundle 610 that has security approval for all software modules included in the software bundle 610. As the development proceeds, the user may realize that the module configuration of at least a software module, for example, the module configuration 615*a* of the software module 620*a* is different from the configuration needed for the application being developed. The user invokes one or more API of the exPaaS system to customize the configuration of the software module 620*a*. The process of customizing a software module of a software bundle is also referred to herein as off-roading, i.e., departing from the recommended path for the software module. The APIs invoked for customizing the software module 620 generate a custom configuration 710 for the software module 620*a*. The exPaaS system tracks the custom configuration and uses the custom configuration for software module 620*a* instead of the module configuration 615*a* originally packaged with the software bundle 610. For all remaining software modules, for example, software modules 620*b*, ..., 620*n*, the exPaaS system continues to use the module configuration 615*b*, ..., 615*n* that were initially included with the software bundle 610 until the user decides to customize any of the remaining software modules. If the exPaaS system receives a request for customizing a software module, the security approval module 530 may send an alert or a message to the user 210 informing the user that the customization will require further security approval. The alert or message may also be sent to a user from the security team. The security approval module 530 may further generate a security report 730 that identifies any software modules that were customized and therefore do not have security approval of the security team or need further approval. The user 210 may not be able to proceed with certain SDLC stages until the application receives a security approval based on the security report 730. For example, the user may not be able to promote the application to be deployed in a production environment until security approval is received. Once the exPaaS system receives security approval for the custom configuration 710 of the software module 620*a*, the exPaaS system allows the application to proceed with subsequent SDLC stages.

In an embodiment, the exPaaS system generates a new software bundle including one or more custom configuration of software modules. Since a developer customized the software module 620*a*, the exPaaS system determines that there may be other developers interested in the customized configuration. The exPaaS system includes the new software bundle in the repository of software bundles and provides the software bundle as an alternative in subsequent user searches. According to an embodiment, the exPaaS system tracks the usage of the new software bundle over a time interval. If the exPaaS system determines that more than a threshold number of applications used the new software bundle, the exPaaS system keeps the new software bundle. If the number of applications using the new software bundle is below a threshold number, the exPaaS system 200 may remove the new software bundle or deprecate it. This process allows the system to grow the software bundle repository based on user contributions as well deprecate less frequently used versions, hence improving the security posture, since the system has to maintain less number of software bundles.

Figure 8:
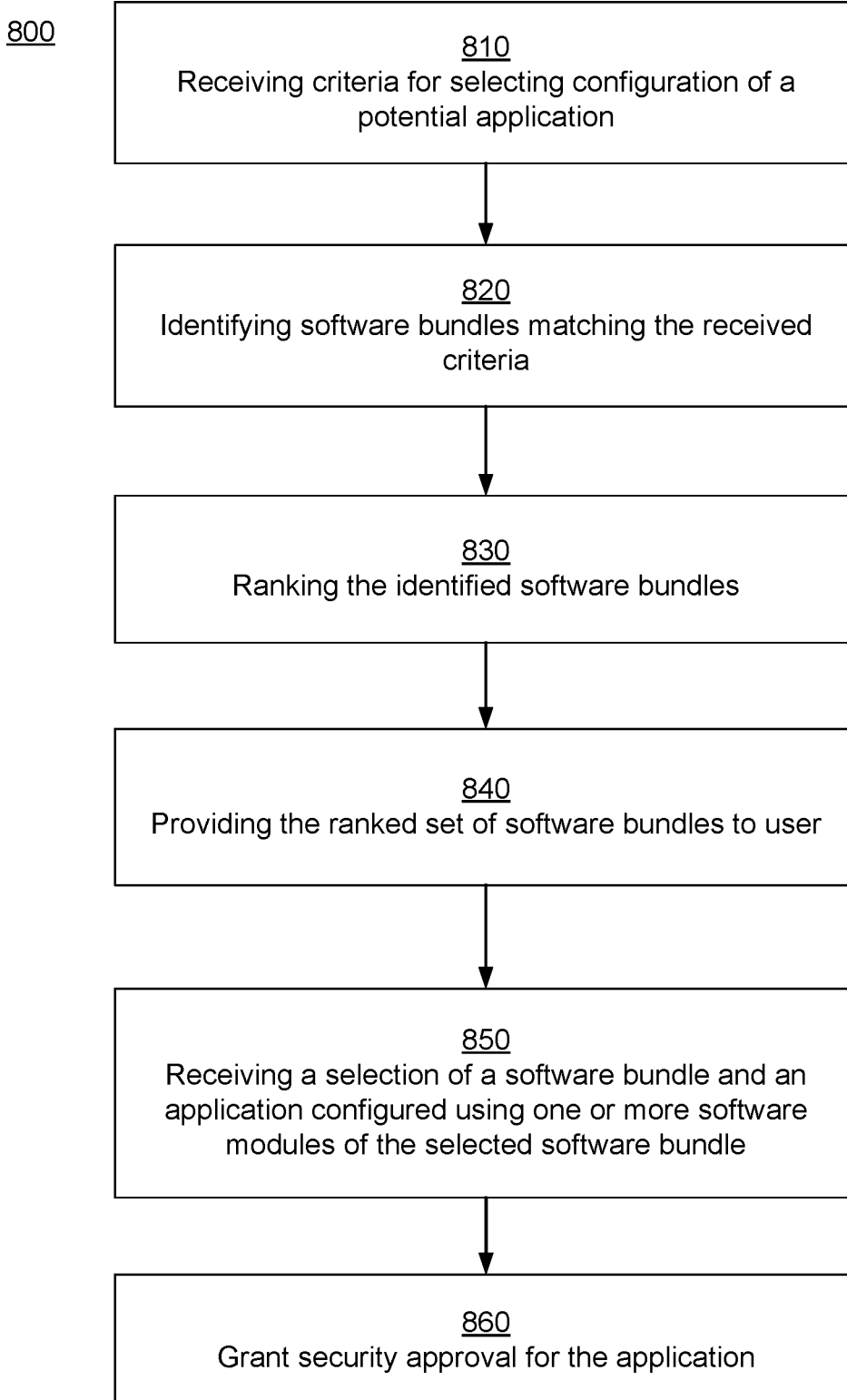
FIG. 8 is a flow chart illustrating the process for security approval of an application using software bundles provided by the exPaaS system, according to one embodiment.

FIG. 8 is a flow chart illustrating the process for security approval of an application using software bundles provided by the exPaaS system, according to one embodiment. The exPaaS system 200 receives 810 a search criteria for selecting configuration of a potential application being developed. The search criteria may be received via a user interface of a search application presented to the users. The search criteria may specify various attributes of the application including a programming language for development of the application, a version of a software artifact used by the application, a communication protocol used for communications by a software module used by the application, or an access permission of a file system used by the application.

The exPaaS system 200 searches through the repository of software bundles to identify one or more software bundles matching the received criteria. The exPaaS system 200 may rank the received software bundles based on various factors including the number of criteria that are satisfied by a software bundle, historical usage of the software bundle (i.e., a number of applications that have previously used the software bundles, and so on. Another factor used for ranking the software bundles is a number of security issues associated with software applications that used the software bundle. Another factor used for ranking the software bundles is a type of security issues indicating the severity of security issues associated with software applications that used the software bundle.

The exPaaS system 200 provides 840 users with a ranked list of software bundles, for example, via a user interface of the search application. The exPaaS system 200 receives 850 a selection of a software bundle from the ranked list. The exPaaS system 200 also receives information describing the application being developed using the selected software bundle. The exPaaS system 200 determines whether all the software modules of the software bundle have security approval. If the exPaaS system 200 determines that the application is using all the software modules of the selected software bundle without any modification or customization, the exPaaS system 200 grants 860 security approval for the application automatically. According to an embodiment, the exPaaS system 200 generates a recommendation to grant security approval to the application and send the recommendation to one or more users, for example, members of a security team. The exPaaS system 200 grants security approval to the application responsive to receiving an approval from one or more users of the security team.

Figure 9:
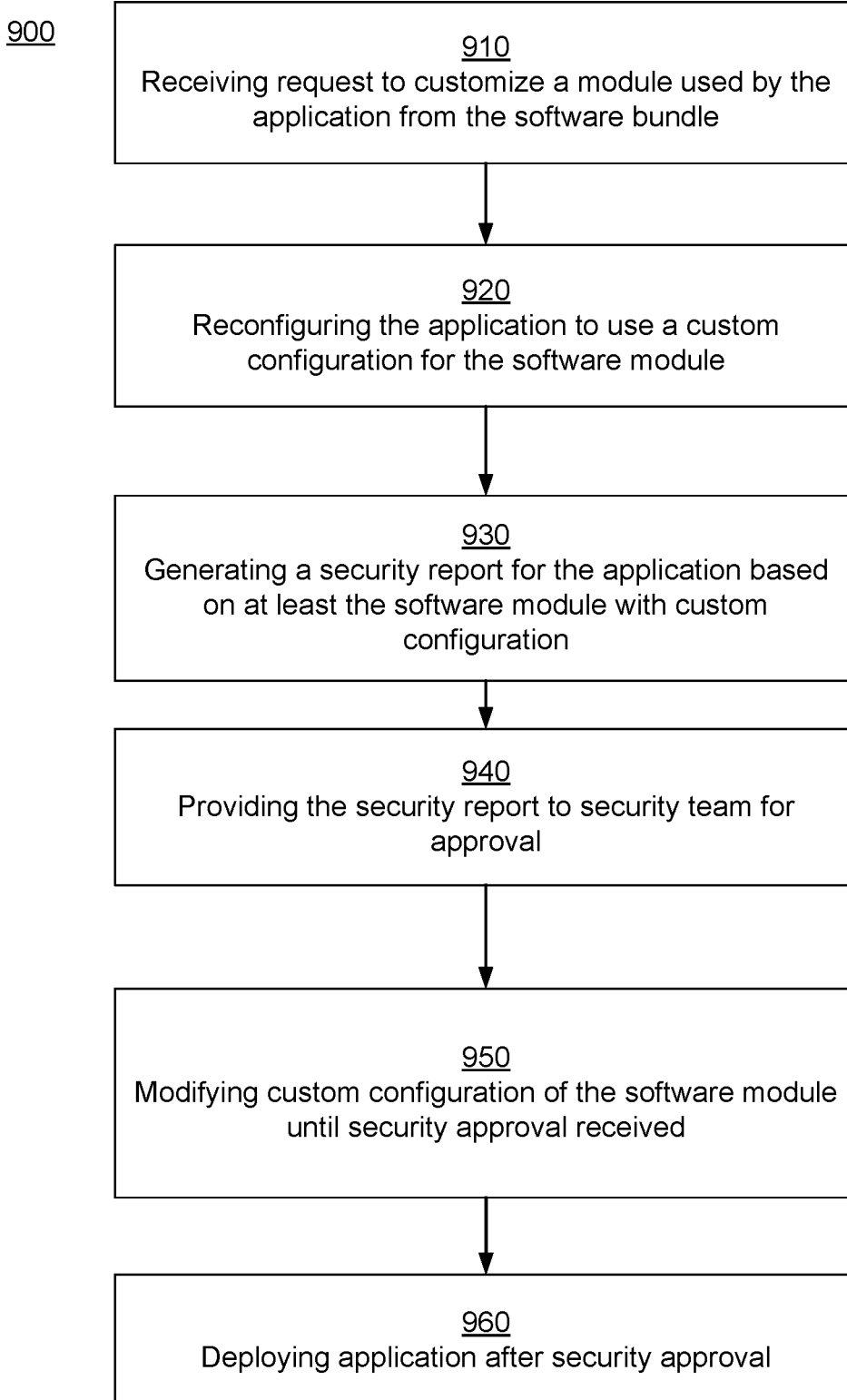
FIG. 9 is a flow chart illustrating the process for security approval of an application using custom configurations of software modules of a software bundle, according to one embodiment.

FIG. 9 is a flow chart illustrating the process for security approval of an application using custom configurations of software modules of a software bundle, according to one embodiment. The exPaaS system 200 receives 910 requests to customize a module of a software bundle used by the application. Accordingly, the developer decides to off-road a particular software module rather than use the configuration that is readily available in the software bundle. The exPaaS system 200 reconfigures 920 the application to use a custom configuration as specified by the developer. The exPaaS system 200 may receive details of the custom configuration from the developer and apply them to the software module.

The exPaaS system 200 determines that the application is not conforming to the configuration provided by the software bundle and accordingly prepares to send a message or alert to the developer and/or the security team informing them that security approval is needed as a result of the customization. The exPaaS system 200 generates 930 security report for the application. The security report identifies the software module that is customized and may provide description of the customization. According to an embodiment, the exPaaS system 200 includes in the security report a difference between the approved configuration of the software module that is included in the software bundle and the customized configuration so that the reviewer can identify the differences easily.

The exPaaS system 200 provides the generated security report to members of the security team for review. The security team may approve the customized configuration or request further modifications needed for approval. The exPaaS system 200 may receive requests to modify 950 the custom configuration of the software module. This process may continue until security approval is obtained from the security team. The exPaaS system 200 may deploy the application after the security approval is received for all customized modules of the software bundle used by the application.

In some embodiments, the system may detect a security vulnerability in a software bundle. In this situation, the system (for example, the security approval module), automatically and efficiently identifies all the applications that are using that software bundle and have not customized it. The security approval module automatically sends the owners or users of those applications, notifications with instructions on how to fix the security vulnerability including deadlines and any other information necessary to make an informed decision. Also, if the application remains non-compliant, the system may remove the application from the SDLC process and/or automatically apply new patches to those applications or use a newer version of a software module that does not have security vulnerability after a threshold time interval (e.g., after certain deadline is passed) while ensuring that the application satisfies any requirements or constraints specified by the developer (or the application owner). Accordingly, the use of software bundles by the exPaaS system allows the system to automatically detect applications with security vulnerabilities as well as automatically fix security vulnerabilities if possible, by applying patches or using appropriate version of the software module determined to have a security vulnerability. A security vulnerability refers to a known security issue in the software module or software bundle, for example, a defect or a feature that allows an unauthorized user to gain access to the system or allow a user to perform an action that the user is not allowed to perform using the system.

Updates to Templates and Software Bundles for Software Modules

Figure 10:
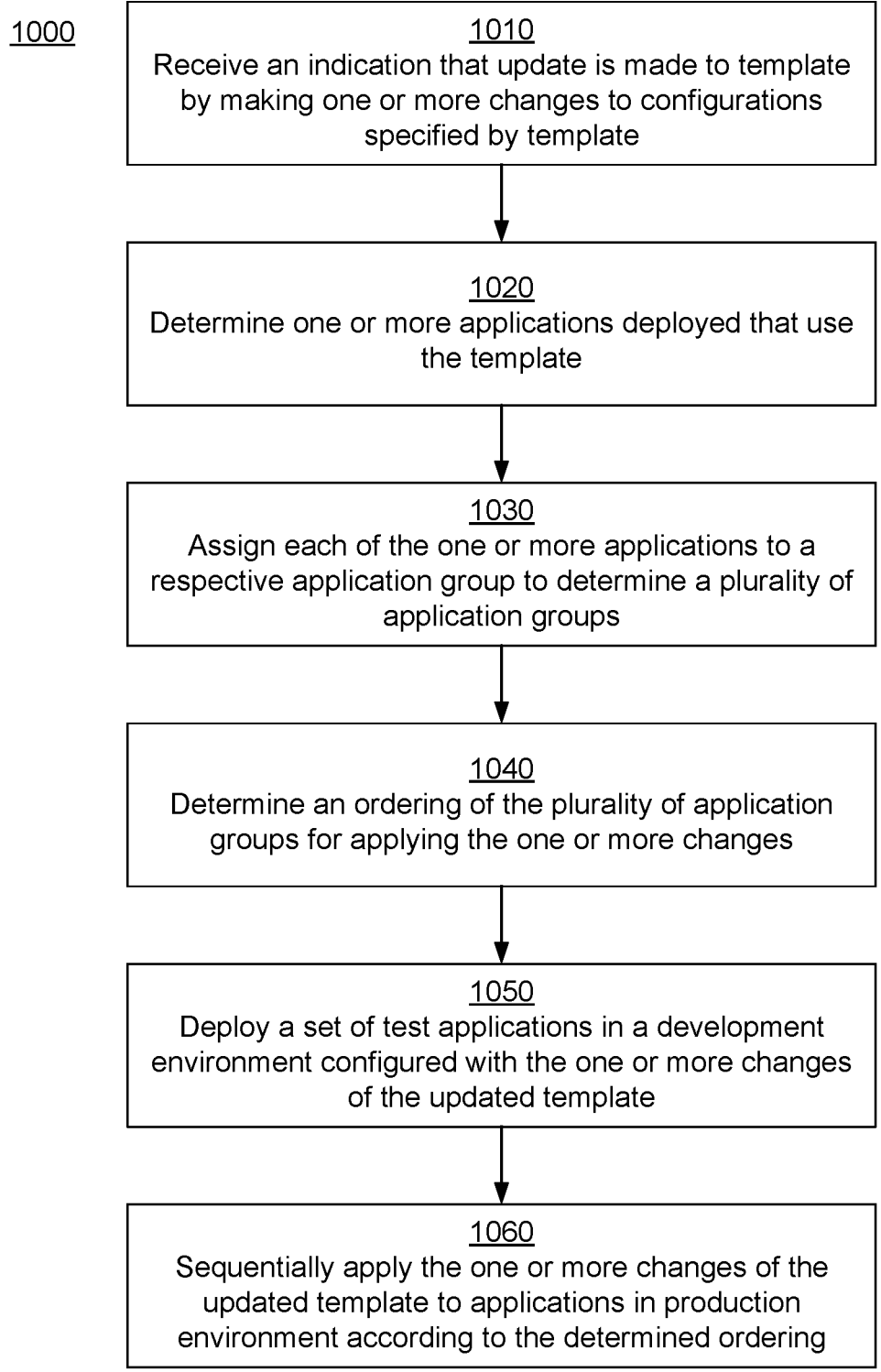
FIG. 10 is a flow chart illustrating the process for configuring applications with updates to one or more templates, according to one embodiment.

FIG. 10 is a flow chart illustrating the process for configuring applications with updates to one or more templates, according to one embodiment. The exPaaS system 200 stores a plurality of software bundles. A software bundle may include a collection of templates for configuring a plurality of software modules. The exPaaS system 200 receives 1010 an indication that an update is made to a template by making one or more changes to configurations specified in the template for a respective software module. The exPaaS system 200 determines 1020 one or more applications deployed in a production environment that use the template. The exPaaS system 200 assigns 1030 each of the one or more applications to a respective application group to determine a plurality of application groups. The exPaaS system 200 determines 1040 an ordering of the plurality of application groups for applying the one or more changes of the updated template. The exPaaS system 200 deploys 1050 a set of test applications in a development environment using a plurality of test modules configured with the one or more changes of the updated template. Responsive to validating the one or more changes based on the set of test applications, the exPaaS system 200 sequentially applies 1060, to each application group, the one or more changes of the updated template according to the determined ordering of the plurality of application groups.

Computer Architecture

Figure 11:
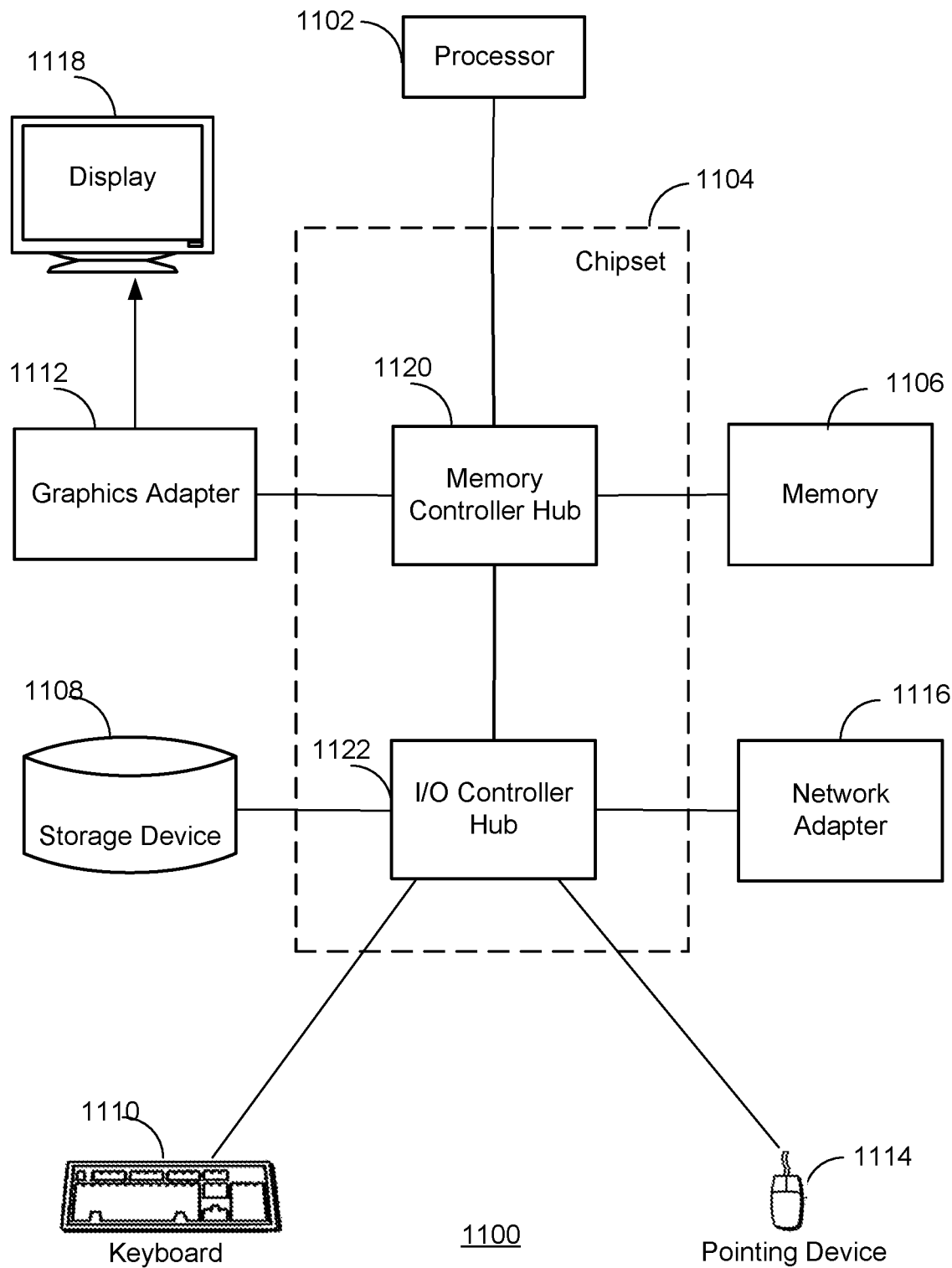
FIG. 11 is a block diagram illustrating the architecture of a typical computer system for use in the environments disclosed herein, according to one embodiment.

FIG. 11 is a block diagram illustrating the architecture of a typical computer system 1100 for use in the environments disclosed herein according to one embodiment. Illustrated are at least one processor 1102 coupled to a chipset 1104. Also coupled to the chipset 1104 are a memory 1106, a storage device 1108, a keyboard 1110, a graphics adapter 1112, a pointing device 1114, and a network adapter 1116. A display 1118 is coupled to the graphics adapter 1112. In one embodiment, the functionality of the chipset 1104 is provided by a memory controller hub 1120 and an I/O controller hub 1122. In another embodiment, the memory 1106 is coupled directly to the processor 1102 instead of the chipset 1104.

The storage device 1108 is a non-transitory computer-readable storage medium, such as a hard drive, compact disk read-only memory (CD-ROM), DVD, or a solid-state memory device. The memory 1106 holds instructions and data used by the processor 1102. The pointing device 1114 may be a mouse, track ball, or other type of pointing device, and is used in combination with the keyboard 1110 to input data into the computer system 1100. The graphics adapter 1112 displays images and other information on the display 1118. The network adapter 1116 couples the computer system 1100 to a network.

As is known in the art, a computer system 1100 can have different and/or other modules than those shown in FIG. 11. In addition, the computer system 1100 can lack certain illustrated modules. For example, a computer system 1100 acting as an exPaaS system 300 may lack a keyboard 1110 and a pointing device 1114. Moreover, the storage device 1108 can be local and/or remote from the computer 1100 (such as embodied within a storage area network (SAN)).

The computer system 1000 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 1108, loaded into the memory 1106, and executed by the processor 1102.

The types of computer systems 1100 used by the system of FIG. 3 can vary depending upon the embodiment and the processing power used by the entity. For example, a client device may be a mobile phone with limited processing power, a small display 1118, and may lack a pointing device 1114. The exPaaS system in contrast, may comprise multiple blade servers working together to provide the functionality described herein.

ADDITIONAL CONSIDERATIONS

The particular naming of the modules, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system modules described herein is merely exemplary, and not mandatory; functions performed by a single system module may instead be performed by multiple modules, and functions performed by multiple modules may instead performed by a single module.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real-time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes and may not have been selected to delineate or circumscribe the inventive subject matter. Accordingly, the disclosure of the embodiments is intended to be illustrative, but not limiting.

What is claimed is:

1. A computer-implemented method for deploying an update to a template, the method comprising:
   storing by an extensible platform-as-a-service (PaaS) system, a plurality of software bundles, wherein a software bundle includes a collection of templates for configuring a plurality of software modules;
   receiving an indication that an update is made to a template by making one or more changes to configurations specified in the template for a respective software module for the template;
   determining, by the extensible PaaS system, one or more applications deployed in a production environment that use the template;
   assigning the one or more applications to a respective application group to determine a plurality of application groups;
   determining an ordering of the plurality of application groups for applying the one or more changes of the updated template;
   deploying a set of test applications in a development environment using a plurality of test modules configured with the one or more changes of the updated template; and
   responsive to validating the one or more changes based on the set of test applications, sequentially applying, to an application group, the one or more changes of the updated template according to the determined ordering of the plurality of application groups.

2. The computer-implemented method of claim 1, wherein the template is associated with a set of attributes including at least one of a name of the template, a type indicating a type of the respective software module for the template, and a provider associated with the template.

3. The computer-implemented method of claim 1, wherein the one or more applications are managed by a plurality of units of an online system, and a unit manages a respective subset of the one or more applications.

4. The computer-implemented method of claim 1, wherein the one or more applications are managed by a plurality of units of an online system.

5. The computer-implemented method of claim 4, wherein a first unit manages a first subset of applications in the one or more applications, and an application in the first subset is a canary application that is configured using a same software bundle as another application in the first subset.

6. The computer-implemented method of claim 5, wherein the canary application is assigned to a first application group in the ordering such that the one or more changes are applied first to the canary application before being applied to the another application in the first subset.

7. The computer-implemented method of claim 1, wherein a software module in the plurality of software modules corresponds to at least one of a source code repository, basic program templates, a collection of resources for creating containerized applications, a configured pipeline for continuous integration (CI), or a configured pipeline for continuous delivery (CD).

8. A non-transitory computer readable storage medium for storing instructions that when executed by one or more computer processors cause the one or more computer processors to perform steps comprising:
    storing by an extensible platform-as-a-service (PaaS) system, a plurality of software bundles, wherein a software bundle includes a collection of templates for configuring a plurality of software modules;
    receiving an indication that an update is made to a template by making one or more changes to configurations specified in the template for a respective software module for the template;
    determining, by the extensible PaaS system, one or more applications deployed in a production environment that use the template;
    assigning the one or more applications to a respective application group to determine a plurality of application groups;
    determining an ordering of the plurality of application groups for applying the one or more changes of the updated template;
    deploying a set of test applications in a development environment using a plurality of test modules configured with the one or more changes of the updated template; and
    responsive to validating the one or more changes based on the set of test applications, sequentially applying, to an application group, the one or more changes of the updated template according to the determined ordering of the plurality of application groups.

9. The non-transitory computer-readable storage medium of claim 8, wherein the template is associated with a set of attributes including at least one of a name of the template, a type indicating a type of the respective software module for the template, and a provider associated with the template.

10. The non-transitory computer-readable storage medium of claim 8, wherein the one or more applications are managed by a plurality of units of an online system, and a unit manages a respective subset of the one or more applications.

11. The non-transitory computer-readable storage medium of claim 8, wherein the one or more applications are managed by a plurality of units of an online system.

12. The non-transitory computer-readable storage medium of claim 11, wherein a first unit manages a first subset of applications in the one or more applications, and an application in the first subset is a canary application that is configured using a same software bundle as another application in the first subset.

13. The non-transitory computer-readable storage medium of claim 12, wherein the canary application is assigned to a first application group in the ordering such that the one or more changes are applied first to the canary application before being applied to the another application in the first subset.

14. The non-transitory computer-readable storage medium of claim 8, wherein a software module in the plurality of software modules corresponds to at least one of a source code repository, basic program templates, a collection of resources for creating containerized applications, a configured pipeline for continuous integration (CI), or a configured pipeline for continuous delivery (CD).

15. A computer system, comprising:
    one or more computer processors; and
    a non-transitory computer-readable storage medium for storing instructions that when executed by the one or more computer processors cause the one or more computer processors to perform steps comprising:
        storing by an extensible platform-as-a-service (PaaS) system, a plurality of software bundles, wherein a software bundle includes a collection of templates for configuring a plurality of software modules;
        receiving an indication that an update is made to a template by making one or more changes to configurations specified in the template for a respective software module for the template;
        determining, by the extensible PaaS system, one or more applications deployed in a production environment that use the template;
        assigning the one or more applications to a respective application group to determine a plurality of application groups;
        determining an ordering of the plurality of application groups for applying the one or more changes of the updated template;
        deploying a set of test applications in a development environment using a plurality of test modules configured with the one or more changes of the updated template; and
        responsive to validating the one or more changes based on the set of test applications, sequentially applying, to an application group, the one or more changes of the updated template according to the determined ordering of the plurality of application groups.

16. The system of claim 15, wherein the template is associated with a set of attributes including at least one of a name of the template, a type indicating a type of the respective software module for the template, and a provider associated with the template.

17. The system of claim 15, wherein the one or more applications are managed by a plurality of units of an online system, and a unit manages a respective subset of the one or more applications.

18. The system of claim 15, wherein the one or more applications are managed by a plurality of units of an online system.

19. The system of claim 18, wherein a first unit manages a first subset of applications in the one or more applications, and an application in the first subset is a canary application that is configured using a same software bundle as another application in the first subset.

20. The system of claim 19, wherein the canary application is assigned to a first application group in the ordering such that the one or more changes are applied first to the canary application before being applied to the another application in the first subset.

* * * * *